United States Patent
Gong et al.

(10) Patent No.: US 12,340,249 B2
(45) Date of Patent: Jun. 24, 2025

(54) METHODS AND SYSTEM FOR THROTTLING ANALYTICS PROCESSING

(71) Applicant: Virtual Instruments Worldwide, Inc., Palo Alto, CA (US)

(72) Inventors: Zhipeng Gong, San Jose, CA (US); Xiongwei He, San Jose, CA (US); Francis Niestemski, Longmeadow, MA (US); Devin Blinn Avery, Madbury, NH (US); Ryan E. Perkowski, Middletown, DE (US); Nicholas York, San Ramon, CA (US)

(73) Assignee: Virtual Instruments Worldwide, Inc., Palo Alto, CA (US)

( * ) Notice: Subject to any disclaimer, the term of this patent is extended or adjusted under 35 U.S.C. 154(b) by 201 days.

(21) Appl. No.: 16/671,140

(22) Filed: Oct. 31, 2019

(65) Prior Publication Data
US 2020/0142746 A1     May 7, 2020

Related U.S. Application Data

(63) Continuation-in-part of application No. 16/234,424, filed on Dec. 27, 2018.
(Continued)

(51) Int. Cl.
*G06F 9/455* (2018.01)
*G06F 9/46* (2006.01)
(Continued)

(52) U.S. Cl.
CPC .......... *G06F 9/5038* (2013.01); *G06F 9/4881* (2013.01); *G06F 9/505* (2013.01)

(58) Field of Classification Search
CPC ...... G06F 9/5038; G06F 9/505; G06F 9/5027; G06F 9/4881
See application file for complete search history.

(56) References Cited

U.S. PATENT DOCUMENTS 6,421,809 B1 * 7/2002 Wuytack ............... G06F 8/4442
716/132
6,480,470 B1 * 11/2002 Breivik ............... H04L 12/5602
370/252
(Continued)

FOREIGN PATENT DOCUMENTS

EP     2262173     12/2010

OTHER PUBLICATIONS

International Application No. PCT/US2019/058976, Search Report and Written Opinion dated Mar. 25, 2020.
(Continued)

*Primary Examiner* — April Y Blair
*Assistant Examiner* — Zhi Chen
(74) *Attorney, Agent, or Firm* — Ahmann Kloke LLP

(57) ABSTRACT

A method comprising: receiving an analytic task which includes a priority indicator associated with the analytic task, determining a position of the analytic task in a task queue, the task queue arranged in an order according to their priority indicators, selecting the analytic task based on the order of the task queue, sending the analytic task to an analytics service to determine if the analytics service has sufficient available resources to perform the analytic task, receiving an indication that the analytics service does not have sufficient available resources to perform the analytic task, repositioning the analytic task within the task queue, selecting the analytic task from the task queue based on the order of the task queue and a new position of the analytic task, sending the analytic task to the analytics service, and retrieving another analytic task to send to the analytics service.

16 Claims, 15 Drawing Sheets

Related U.S. Application Data

(60) Provisional application No. 62/753,360, filed on Oct. 31, 2018, provisional application No. 62/611,892, filed on Dec. 29, 2017.

(51) Int. Cl.
  *G06F 9/48* (2006.01)
  *G06F 9/50* (2006.01)

(56) References Cited

U.S. PATENT DOCUMENTS

| | | | |
|---|---|---|---|
| 6,499,107 B1* | 12/2002 | Gleichauf | H04L 63/0263 |
| | | | 726/13 |
| 7,185,192 B1 | 2/2007 | Kahn | |
| 7,193,968 B1 | 3/2007 | Kapoor et al. | |
| 7,634,595 B1 | 12/2009 | Brown | |
| 7,711,822 B1* | 5/2010 | Duvur | G06F 9/5005 |
| | | | 709/224 |
| 7,783,740 B2 | 8/2010 | Siorek | H04L 43/02 |
| | | | 709/224 |
| 8,065,133 B1 | 11/2011 | Asbridge | |
| 8,495,611 B2 | 7/2013 | McCarthy | |
| 8,589,552 B1 | 11/2013 | Jones et al. | |
| 8,738,972 B1 | 5/2014 | Bakman et al. | |
| 9,026,687 B1 | 5/2015 | Govande | |
| 9,462,077 B2* | 10/2016 | Zohar | G06F 21/604 |
| 9,928,183 B2 | 3/2018 | Svendsen | |
| 10,044,566 B1 | 8/2018 | Grisco | |
| 10,216,812 B2 | 2/2019 | Witkop | |
| 10,505,959 B1 | 12/2019 | Wang | |
| 10,735,430 B1 | 8/2020 | Stoler | |
| 2002/0083169 A1 | 6/2002 | Aki | |
| 2002/0156883 A1 | 10/2002 | Natarajan | |
| 2003/0095504 A1 | 5/2003 | Ogier | |
| 2003/0167327 A1 | 9/2003 | Baldwin | |
| 2004/0083285 A1 | 4/2004 | Nicolson | |
| 2005/0081208 A1 | 4/2005 | Gargya | |
| 2005/0229182 A1 | 10/2005 | Grover | |
| 2006/0129415 A1* | 6/2006 | Thukral | G06Q 10/087 |
| | | | 705/28 |
| 2006/0184626 A1 | 8/2006 | Agapi | |
| 2006/0242647 A1 | 10/2006 | Kimbrel | |
| 2006/0271677 A1 | 11/2006 | Mercier | |
| 2007/0136541 A1 | 6/2007 | Herz | |
| 2007/0169125 A1* | 7/2007 | Qin | G06F 9/5016 |
| | | | 718/102 |
| 2008/0019499 A1 | 1/2008 | Benfield | |
| 2008/0104248 A1 | 5/2008 | Yahiro | |
| 2009/0016236 A1 | 1/2009 | Alcala | |
| 2009/0025004 A1 | 1/2009 | Barnard et al. | |
| 2009/0106256 A1 | 4/2009 | Safari | |
| 2009/0125909 A1 | 5/2009 | Li et al. | |
| 2009/0241113 A1 | 9/2009 | Seguin | |
| 2009/0259749 A1 | 10/2009 | Barrett | |
| 2009/0319580 A1 | 12/2009 | Lorenz | |
| 2010/0248771 A1 | 9/2010 | Brewer et al. | |
| 2010/0275212 A1* | 10/2010 | Saha | G06F 9/5027 |
| | | | 718/104 |
| 2011/0107148 A1 | 5/2011 | Franklin | |
| 2011/0141119 A1 | 6/2011 | Ito | |
| 2011/0225017 A1 | 9/2011 | Radhakrishnan | |
| 2012/0030352 A1 | 2/2012 | Sauma Vargas | |
| 2012/0044811 A1 | 2/2012 | White | |
| 2012/0076001 A1 | 3/2012 | Saitou | |
| 2012/0089726 A1 | 4/2012 | Doddavula | |
| 2012/0131593 A1 | 5/2012 | DePetro | |
| 2012/0192197 A1 | 7/2012 | Doyle | |
| 2012/0221810 A1* | 8/2012 | Shah | G06F 13/1642 |
| | | | 711/158 |
| 2013/0054221 A1* | 2/2013 | Artzi | G06F 16/00 |
| | | | 703/22 |
| 2013/0060932 A1 | 3/2013 | Ofek | |
| 2013/0067089 A1 | 3/2013 | Synytskyy et al. | |
| 2013/0117847 A1 | 5/2013 | Friedman | |
| 2013/0152200 A1 | 6/2013 | Alme | |
| 2013/0185729 A1 | 7/2013 | Vasic et al. | |
| 2013/0285855 A1* | 10/2013 | Dupray | G01S 19/48 |
| | | | 342/451 |
| 2013/0340079 A1 | 12/2013 | Gottlieb et al. | |
| 2014/0052610 A1* | 2/2014 | Aggarwal | G06Q 10/06 |
| | | | 726/26 |
| 2014/0112187 A1 | 4/2014 | Kang | |
| 2014/0164957 A1* | 6/2014 | Shin | G06F 3/0487 |
| | | | 715/806 |
| 2014/0173034 A1 | 6/2014 | Liu | |
| 2014/0173113 A1 | 6/2014 | Vemuri et al. | |
| 2014/0181839 A1* | 6/2014 | Xu | G06F 9/505 |
| | | | 718/107 |
| 2014/0331277 A1 | 11/2014 | Frascadore | |
| 2014/0358972 A1 | 12/2014 | Guarrieri et al. | |
| 2015/0046920 A1* | 2/2015 | Allen | G06F 9/50 |
| | | | 718/1 |
| 2015/0074251 A1 | 3/2015 | Tameshige | |
| 2015/0222527 A1 | 8/2015 | Shah et al. | |
| 2016/0004475 A1 | 1/2016 | Beniyama | |
| 2016/0044035 A1 | 2/2016 | Huang | |
| 2016/0055038 A1 | 2/2016 | Ghosh et al. | |
| 2016/0100066 A1 | 4/2016 | Yamada | |
| 2016/0119234 A1 | 4/2016 | Valencia Lopez | |
| 2016/0275642 A1* | 9/2016 | Abeykoon | G06V 10/94 |
| 2016/0359897 A1 | 12/2016 | Yadav | |
| 2017/0034207 A1 | 2/2017 | Low et al. | |
| 2017/0053076 A1 | 2/2017 | Lulla et al. | |
| 2017/0085456 A1 | 3/2017 | Whitner | |
| 2017/0123849 A1 | 5/2017 | Tian | |
| 2017/0168866 A1 | 6/2017 | Kono | |
| 2017/0201574 A1 | 7/2017 | Luo | |
| 2017/0293414 A1 | 10/2017 | Pierce et al. | |
| 2017/0317899 A1 | 11/2017 | Taylor | |
| 2018/0067776 A1 | 3/2018 | Chen | |
| 2018/0081501 A1 | 3/2018 | Johnston | |
| 2018/0115585 A1 | 4/2018 | Rubakha | |
| 2018/0130202 A1* | 5/2018 | Wang | G06N 3/0454 |
| 2018/0165451 A1 | 6/2018 | Kawakita | |
| 2018/0262432 A1 | 9/2018 | Ozen | |
| 2018/0322415 A1* | 11/2018 | Bendre | H04L 41/12 |
| 2018/0324045 A1 | 11/2018 | Grisco | |
| 2018/0329794 A1 | 11/2018 | Prieto et al. | |
| 2019/0065230 A1 | 2/2019 | Tsirkin | |
| 2019/0073239 A1 | 3/2019 | Konnath | |
| 2019/0089617 A1 | 3/2019 | Raney | |
| 2019/0163589 A1 | 5/2019 | McBride | |
| 2019/0171509 A1* | 6/2019 | Hardy | G06F 3/0689 |
| 2019/0207837 A1 | 7/2019 | Malhotra | |
| 2019/0207841 A1 | 7/2019 | Perkowski | |
| 2019/0243671 A1 | 8/2019 | Yadav | |
| 2019/0311629 A1* | 10/2019 | Sierra | G06Q 10/02 |

OTHER PUBLICATIONS

International Application No. PCT/US2019/059282, Search Report and Written Opinion dated Apr. 7, 2020.
Chandramouli, Ramaswamy, "Security Assurance Requirements for Hypervisor Deployment Features," Seventh International Conference on Digital Society, Feb. 2013.
Ramamoorthy, S. et al. "A Preventive Method for Host Level Security in Cloud Infrastructure," Proceedings of the 3rd International Symposium on Big Data and Cloud Computing Challenges, Feb. 2016.
Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.
Urias, Vincent E. et al., "Hypervisor Assisted Forensics and Incident Response in the Cloud," 2016 IEEE International Conference on Computer and Information Technology, Dec. 2016.
International Application No. PCT/US2018/067760, Search Report and Written Opinion dated Mar. 8, 2019.
Androulidakis, G. et al., "Improving Network Anomaly Detection via Selective Flow-Based Sampling," IET Communications, vol. 2, No. 3, pp. 399-409, Mar. 2008.

(56) References Cited

OTHER PUBLICATIONS

Cejka, Tomas et al., "NEMEA: A Framework for Network Traffic Analysis," Proceedings of the 12th Conference on Network and Service Management (CNSM 2016), pp. 195-201, Nov. 2016.
Kind, Andreas et al., "Histogram-Based Traffic Anomaly Detection," IEEE Transactions on Network Service Management, vol. 6, No. 2, pp. 110-121, Jun. 2009.
Wang, Wei et al., "Network Traffic Monitoring, Analysis and Anomaly Detection," Guest Editorial, IEEE Network, pp. 6-7, May 2011.
Bhumip Khasnabish "Emerging Enterprise Storage Systems: Storage or System Area Networks (SANs)", [Online], pp. 192-195, [Retrieved from Internet on Aug. 25, 2021], , (Year: 2002).
Suresh Muknahallipatna et al., "The Effect of End to End Latency in a Distributed Storage Area Network on Microsoft Exchangew Server 2003 Performance", [Online], pp. 1-9, [Retrieved from Inter3ent on Aug. 25, 2021], (Year: 2004).
T. Brothers, N. Mandagere et al., "Microsoft Exchange Implementation on A Distributed Storage Area Network", [Online], pp. 251-251, [Retrieved from Internet on Aug. 25, 2021], , (Year: 2008).
Vladimir V. Riabov, "Storage Area Networks (SANs)", [Online], pp. 1-11, [Retrieved from Internet on Aug. 25, 2021], (Year: 2005).

\* cited by examiner

METHODS AND SYSTEM FOR THROTTLING ANALYTICS PROCESSING

CROSS-REFERENCE TO RELATED APPLICATIONS

The present application claims benefit of U.S. Provisional Patent Application Ser. No. 62/753,360, filed Oct. 31, 2018, and entitled "Methods and System for Throttling Analytics Processing," which is incorporated by reference herein and the present application is a continuation in part of the U.S. Nonprovisional patent application Ser. No. 16/234,424, filed Dec. 27, 2018, and entitled "System and Method of Dynamically Assigning Device Tiers Based on Application," which is incorporated by reference herein and which claim/s benefits of U.S. Provisional Patent Application Ser. No. 62/611,892, filed Dec. 29, 2017, and entitled "Systems and Methods for Performance Management of Data Infrastructure," which is incorporated by reference herein. In addition, the following applications filed on Dec. 27, 2018, are incorporated by reference herein: U.S. Nonprovisional patent application Ser. No. 16/234,353 entitled "System and Method of Application Discovery," U.S. Nonprovisional patent application Ser. No. 16/234,384 entitled "Systems and Methods of Application-Aware Improvement of Storage Network Traffic," U.S. Nonprovisional patent application Ser. No. 16/234,402 entitled "System and Method of Flow Source Discovery," U.S. Nonprovisional patent application Ser. No. 16/234,440 entitled "Systems and Methods of Discovering and Traversing Coexisting Topologies," and U.S. Nonprovisional patent application Ser. No. 16/234,452 entitled "System and Method of Cross-Silo Discovery and Mapping of Storage, Hypervisors and Other Network Objects."

BACKGROUND

Complexity of enterprise networks has increased to a point where even information technology (IT) administrators may not be aware of the computing and storage resources on which mission-critical applications of the organization are running on.

Enterprise networks consist of computing and storage resources designed to run business-related applications of an organization. Applications of the enterprise network, include for example email service, web service, database, customer relationship management (CRM), data file, virtual desktop infrastructure (VDI), enterprise resource planning (ERP), and the like.

In a complex data center monitoring system, data analysis software needs to run almost continuously to help IT administrators detect problems with applications of the enterprise network and identify root causes of the detected problems as early as possible to minimize the impact to end users of these applications. The data center monitoring system may include multiple analytic applications, each capable of monitoring one or more aspects of the enterprise network. Some of these analytic applications may include application discovery, flow source discovery, application-centric infrastructure management, and the like. Depending on the size, complexity, and functionality of related networks, each of these analytic applications may involve a large amount of data. For example, application discovery may be utilized to discover and monitor new and existing applications of the enterprise network. Furthermore, application discovery may determine one or more entities of the infrastructure where important applications are located as well as monitor application behavior and their effect on infrastructure resources.

The analytic application of application discovery may be executed using multiple analytic tasks. In some embodiments, each analytic task may be responsible for discovering or monitoring one application of the enterprise network. In various embodiments, multiple analytic tasks may be responsible for executing various aspects of the discovering and monitoring of one application of the enterprise network. In another example, application-centric infrastructure management may receive a list of applications of the enterprise network to monitor, identify one or more entities of the enterprise network, such as virtual machines and hosts, associated with the monitored applications, assign a polling interval to the identified entities of the enterprise network, and performing the polling. The application-centric infrastructure management system may execute multiple analytic tasks. In some embodiments, each analytic task may be responsible for polling one of the monitored applications. Analytic applications of the enterprise network may utilize one or more analytic services of the enterprise network. Analytic services may include cloud-based and on-premises software capable.

Furthermore, an increasing amount of data may increase resource utilization and pressure the ability of an analytic service to handle all of the analysis applications, such as application discovery and application-centric infrastructure management. Analytic tasks vary not only in their function but also in the number of analytic resources required to complete the task, time sensitivity, etc. There are limited analytic resources available to the analytic service. If a particular analytic service is over-subscribed, the risk of the particular analytic service crashing or limiting other mission-critical functionality increases. On the other hand, if a particular analytic service is underutilized, that would decrease the efficiency of the particular analytic service.

Enterprise networks are increasingly moving towards a combination of on-premise and cloud-based infrastructure, making the ability to determine computing and storage resources associated with business-related application more difficult.

Corporations demand acceptable levels of performance, reliability, redundancy, and security from their computing and storage devices. One way to achieve performance, reliability, and redundancy is to provide more resources than the computing environment would ever need. Unfortunately, the cost of information technology equipment, software and personnel can be prohibitively expensive and runs contrary to an overall goal of an enterprise of profitability. Every corporation must strike a balance between their cost of additional computing and storage versus performance, reliability and redundancy benefits of the additional computing and storage resources. For example, a simplified topology 1300 of FIG. 13 includes device A 1310, device B 1320, and device C 1330. In this example topology, device C 1330 relies on device B 1320; for example, device C 1330 does not function until it receives a signal from device B 1320, and device B 1320 relies on device A 1310. In general, existing monitoring solutions usually focus on the final node of the topology, and only focus on device C 1330.

One way for IT administrators to monitor aspects of the increasingly complex enterprise network is with assistance from a wide variety of standalone and integrated software tools available to aid in monitoring various aspects of the enterprise network. These tools include standalone software such as IT management software and an application performance software. For example, routers may be integrated with a network protocol that provides the ability to collect IP network traffic as it enters or exits the router. Servers may be integrated with software to collect information regarding hosts and storage device communicating with the server. However, each standalone or integrated software may capture data regarding different aspects of the enterprise network. For example, IP network traffic may provide data such as the speed of each hop from the router to a host but would not capture data regarding attributes of the host, such as the operating system running on the host or CPU usage of the host. Furthermore, data provided by each standalone or integrated software may be viewed on their own platform and may be isolated from one another. This may make pinpointing the reason for a change in the reliability or performance of a mission critical application such as VDI, more difficult.

In one example involving the difficulty of identifying the root of a problem, a user of the enterprise network complains of slow response of the virtual desktop application of the enterprise network. The IT administrator may run a diagnostic, using storage performance monitoring tools, on one or more storage resources on which the VDI application is known to be running. The storage performance monitoring tool may determine that no storage performance problem exists. A common solution to the issue may be to increase the storage array capacity of the enterprise network, which may not result in an improvement in response time of the storage array. The software integrated into routers of the enterprise network may not be able to pin point reasons for the slow response of the VDI application, since this software would only have access data regarding traffic on the routers, and not the performance of other entities of the VDI application connected to the routers.

SUMMARY

An example system may comprise one or more processors, memory containing instructions configured to control the one or more processors to: receive, by an analytics task submitter, a first analytic task, the first analytic task including a priority indicator associated with the first analytic task, determine, by the analytic task submitter, a position of the first analytic task in a task queue, the task queue including a plurality of analytic tasks arranged in an order according to their respective priority indicators, the determining the position of the first analytic task being based at least on the priority indicator of the first analytic task, select, by an analytic task manager, the first analytic task from the task queue based on the order of the task queue, send, by the analytic task manager, the first analytic task from the task queue to an analytics service to, at least in part, determine if the analytics service has sufficient available resources to perform the first analytic task, receive, by the analytic task manager, a first indication that the analytics service does not have sufficient available resources to perform the first analytic task, reposition the first analytic task within the task queue, select, by an analytic task manager, the first analytic task from the task queue based on the order of the task queue and a new position of the first analytic task, send, by the analytic task manager, the first analytic task from the task queue to the analytics service, and retrieve a second analytic task from the task queue to send to the analytics service.

In various embodiments, the example system wherein the first indication is rejection signal. In some embodiments, the example system comprising memory further containing instructions configured to control the one or more processor to: send, by the analytics service, a utilization indication signal if a current workload of the analytic service is greater than a predetermined threshold. In one example, the repositioning the first analytic task within the task queue includes lowering the priority indicator of the first analytic task by one level of less significant priority. In one embodiment, the repositioning the first analytic task within the task queue includes moving the first analytic task to the end of the task queue. In various embodiments, the example system further comprising memory further containing instructions configured to control the one or more processor to: perform, by the analytic service, the second analytic task, and receive, by the analytic task manager, a second indication that the analytics service does have sufficient available resources to perform the second analytic task, where the second indication is an acceptance signal. In various embodiments, the example system wherein determining the position of the first analytic task is further based on a tier of service of one or more entities of an enterprise network associated with the first analytic task.

An example system may comprise one or more processors. The memory containing instructions to control the one or more processors to control the one or more processors to: receive a plurality of application identifiers, each of the plurality of application identifiers identifying at least one of a plurality of application instances of an enterprise network, receive a plurality of virtual machine (VM) identifiers, each of the plurality of virtual machine identifiers identifying one virtual machine of a plurality of virtual machines of the enterprise network executing at least one of the plurality of application instances, receive virtual machine information indicating which of the plurality of application instances of the enterprise network is running on which one of the plurality of virtual machines, for each application instance: determine a tier of service the plurality of application instances, assign the tier of service that particular application instance to the virtual machine executing that particular application, assign at least one polling interval to the application instance based on that particular application instance's assigned tier of service, each polling interval indicating a time when metrics are retrieved from that particular application instance, and retrieve metrics from each of the plurality of application instances at the determined polling interval, for each of the plurality of virtual machines: determine a mapping that maps each of the plurality of virtual machines to a host of a plurality of hosts of the enterprise network executing that virtual machine, assign the tier of service at that particular virtual machine to the host executing that particular virtual machine, assign at least one polling interval to the virtual machine based on that particular virtual machine's assigned tier of service, each polling interval indicating the time when metrics are retrieved from that particular virtual machine, and retrieving metrics from the virtual machine at the assigned polling interval, assign at least one polling interval to each host based on that particular host's tier of service, each polling interval indicating a time when metrics are retrieved from that particular host, retrieve metrics from each of the plurality of hosts at the assigned polling interval, compare each of the received metrics from each of the plurality of application instances to a first tier metrics threshold, the first tier metric threshold being based on a type of the particular metric retrieved and the particular tier of service for that application, compare each of the received metrics from each of the plurality of virtual machines to a second tier metrics threshold, the second tier metric threshold being based on a type of the particular metric retrieved and the particular tier of service for that virtual machine, compare each of the received metrics from each of the plurality of host to a third tier metrics threshold, the third tier metric threshold being based on a type of the particular metric retrieved and the particular tier of service for that host, if an alarm trigger condition is satisfied based on any of the comparisons, then triggering an alarm event, and output an alarm notification, the alarm notification based on the alarm event, the alarm notification identifying the application, the tier of service of the application and metric that triggered the alarm event.

In various embodiments, the example system further comprises at least a subset of different virtual machines with different tiers of service having different polling intervals. In some embodiments, the tier of service for each of the plurality of application instances are retrieved from an application discovery system. In one embodiment, the tier of service for each of the plurality of application instances are retrieved from an IT management software. In various embodiments, the tier of service for each of the plurality of application instances are retrieved from an application performance integration platform. In one embodiment, the tier of service for each of the plurality of application instances are retrieved from a user of the enterprise. In some embodiments, the plurality of virtual machine identifiers are retrieved from a plurality of virtual machine data probes integrated within the enterprise network.

In one embodiment, the example system further comprising: for each of a plurality of hosts with two or more tiers of service, assigning one polling interval based on the most important tier of service of the two or more tiers of service of that host.

An example method comprises receiving a plurality of virtual machine (VM) identifiers, each of the plurality of virtual machine identifiers identifying one virtual machine of a plurality of virtual machines of the enterprise network executing at least one of the plurality of application instances, receiving virtual machine information indicating which of the plurality of application instances of the enterprise network is running on which one of the plurality of virtual machines, for each application instance: determining a tier of service the plurality of application instances, assigning the tier of service that particular application instance to the virtual machine executing that particular application, assigning at least one polling interval to the application instance based on that particular application instance's assigned tier of service, each polling interval indicating a time when metrics are retrieved from that particular application instance, and retrieving metrics from each of the plurality of application instances at the determined polling interval, for each of the plurality of virtual machine: determining a mapping that maps each of the plurality of virtual machines to a host of a plurality of hosts of the enterprise network executing that virtual machine, assigning the tier of service at that particular virtual machine to the host executing that particular virtual machine, assigning at least one polling interval to the virtual machine based on that particular virtual machine's assigned tier of service, each polling interval indicating the time when metrics are retrieved from that particular virtual machine, and retrieving metrics the virtual machine at the assigned polling interval, assigning at least one polling interval to each host based on that particular host's tier of service, each polling interval indicating a time when metrics are retrieved from that particular host, retrieving metrics from each of the plurality of hosts at the assigned polling interval, comparing each of the received metrics from each of the plurality of application instances to a first tier metrics threshold, the first tier metric threshold being based on a type of the particular metric retrieved and the particular tier of service for that application, comparing each of the received metrics from each of the plurality of virtual machines to a second tier metrics threshold, the second tier metric threshold being based on a type of the particular metric retrieved and the particular tier of service for that virtual machine, comparing each of the received metrics from each of the plurality of host to a third tier metrics threshold, the third tier metric threshold being based on a type of the particular metric retrieved and the particular tier of service for that host, if an alarm trigger condition is satisfied based on any of the comparisons, then triggering an alarm event, and outputting an alarm notification, the alarm notification based on the alarm event, the alarm notification identifying the application, the tier of service of the application and metric that triggered the alarm event.

An example computer program product comprising a computer readable storage medium having program code embodied therewith, the program code executable by a computing system to cause the computing system to perform receiving a plurality of virtual machine (VM) identifiers, each of the plurality of virtual machine identifiers identifying one virtual machine of a plurality of virtual machines of the enterprise network executing at least one of the plurality of application instances, receiving virtual machine information indicating which of the plurality of application instances of the enterprise network is running on which one of the plurality of virtual machines, for each application instance: determining a tier of service the plurality of application instances, assigning the tier of service that particular application instance to the virtual machine executing that particular application, assigning at least one polling interval to the application instance based on that particular application instance's assigned tier of service, each polling interval indicating a time when metrics are retrieved from that particular application instance, and retrieving metrics from each of the plurality of application instances at the determined polling interval, for each of the plurality of virtual machine: determining a mapping that maps each of the plurality of virtual machines to a host of a plurality of hosts of the enterprise network executing that virtual machine, assigning the tier of service at that particular virtual machine to the host executing that particular virtual machine, assigning at least one polling interval to the virtual machine based on that particular virtual machine's assigned tier of service, each polling interval indicating the time when metrics are retrieved from that particular virtual machine, and retrieving metrics the virtual machine at the assigned polling interval, assigning at least one polling interval to each host based on that particular host's tier of service, each polling interval indicating a time when metrics are retrieved from that particular host, retrieving metrics from each of the plurality of hosts at the assigned polling interval, comparing each of the received metrics from each of the plurality of application instances to a first tier metrics threshold, the first tier metric threshold being based on a type of the particular metric retrieved and the particular tier of service for that application, comparing each of the received metrics from each of the plurality of virtual machines to a second tier metrics threshold, the second tier metric threshold being based on a type of the particular metric retrieved and the particular tier of service for that virtual machine, comparing each of the received metrics from each of the plurality of host to a third tier metrics threshold, the third tier metric threshold being based on a type of the particular metric retrieved and the particular tier of service for that host, if an alarm trigger condition is satisfied based on any of the comparisons, then triggering an alarm event, and outputting an alarm notification, the alarm notification based on the alarm event, the alarm notification identifying the application, the tier of service of the application and metric that triggered the alarm event.

DETAILED DESCRIPTION

Figure 1:
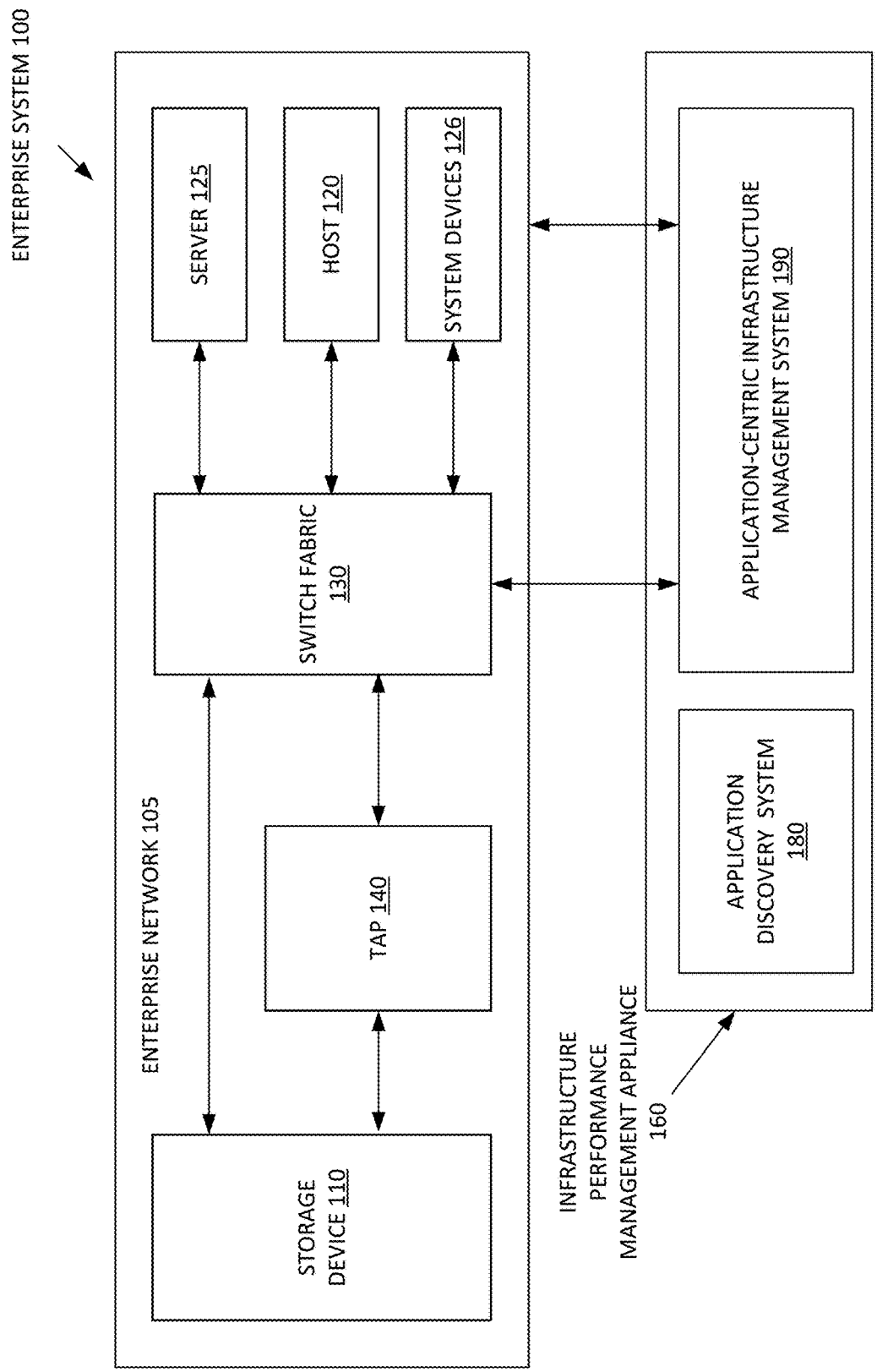
FIG. 1 depicts a block diagram of an enterprise system capable of providing an application-centric infrastructure management system of the enterprise network according to some embodiments.

Various embodiments provide customers to deliver on complex requirements of their application infrastructure. Systems discussed herein may provide insights into the performance and availability of the end-to-end system—across physical, virtual, and cloud environments. The system may intelligently capture, correlate, and/or analyze both breadth and depth of data, transforming data regarding an assets/applications of an enterprise network into answers and actionable insights. This allows the promotion of performance-based Service Level Agreements, changing the value of the infrastructure. With these insights, user may be able to take control of their environment, accurately inform collaborative dialogues, and drive business outcomes.

An application-centric infrastructure management system may be used to give IT administrator awareness of applications and the network resources, including service level assurance (SLA). Application-centric infrastructure management may obtain real-time views of the infrastructure that is most relevant and important to the IT administrator. In addition, the application-centric infrastructure management system may determine entities of the infrastructure, such as virtual machines (VMs), where important applications are located and monitor the effect of applications on infrastructure resources, with emphasis on SLA.

An entity may be any physical or virtual component of the enterprise network and may include servers, routers, switches, and the like. The SLA is a contract provided by a vendor outlining requirements that the device associated with the SLA has to uphold and what will happen if the device fails to perform the contractual requirements. Furthermore, the SLA also outlines how the requirements will be monitored. There may be different SLAs associated with different types of entities. The concept of SLA may be implemented in the form of tier of service. Tier of service may include multiple alarms that may be a set of an industry-standard or a custom value to monitor compliance of an entity of the enterprise network and a specific criticality level.

The application-centric infrastructure management system may receive a list of applications of the enterprise network. In some embodiments, the list includes entities of the enterprise network which make up each of the applications of the enterprise network listed in the list.

The application-centric infrastructure management system may receive a list of applications (or a subset of the list) from the IT administrator or a user of the enterprise network. In various embodiments, the application-centric infrastructure management system may receive the list of applications or a subset of the list of applications from an application discovery system, which may be a part of an infrastructure performance management appliance. The list of applications may include application data. In this example, the application data includes attributes of the application such as application identifiers, tier of service of the application, application metrics, and an application polling interval. The application identifiers may identify an application instance of the enterprise network 105. In some embodiments, application metrics are measurable properties of the application, such as application read-response time.

The tier of service may be used to prioritize one application or group of applications over another. The tier of service may also be used to group similar service levels, which may correspond to critical levels of applications. In one example, the enterprise network may comprise four tiers, with the most important and business-critical tier named "tier 0," followed by, in order of decreasing importance, "tier 1," "tier 2", and "tier 3." The tier of service of an application propagates to the entities associated with the application. When an entity is a member of a tier, it becomes subject to SLA alarms and tiered alarm thresholds associated with the tier. It will be appreciated that the tiers of service may be in any order, and prioritization may change based on the different tier orderings.

In some embodiments, an analytics task submitter may receive multiple analytic tasks from an application-centric infrastructure management system. The analytics tasks submitter may be a part of the application-centric infrastructure management system. The application-centric infrastructure management system may assign priority indicators to one or more analytic tasks. The analytic task factor may include a time that the analytic task was received by the analytic task submitter, an analytic application priority, and a tier of service of one or more entities of the enterprise network associated with the analytic task. For example, the analytic task submitter may receive one analytic task from the application-centric infrastructure management system to monitor the web service application of the enterprise network, which has a tier of service of 1. In this example, the tier of service of 1 means that is it an important application to the enterprise network. The one analytic task may be placed in the task queue ahead of another analytic task received from the analytic application, application discovery, to discover or monitor an application that has a tier of service of 3. For example, the user of the enterprise system may prioritize one analytic application, such as application discovery over another analytic application, such as flow source discovery.

In various embodiments, the analytic task factor may include the current or predicted workload of the enterprise application associated with the analytic application. For example, between the hours of 9 a.m. to 6 p.m., or office hours, the email service of an enterprise system is particularly busy. During this time, the analytic task submitter may prioritize analytic tasks associated with the email service during office hours. Alternatively, the analytic task submitter may schedule analytic tasks associated with the email service to time slots within the 9 a.m. to 6 p.m. time frames with lower workloads. In another example, the analytic task submitter may schedule analytic tasks associated with the email service to time slots outside office hours.

In various embodiments, the application-centric infrastructure management system may send an analytic task at a head, or a first position, of the task queue to an analytics service. In some embodiments, the analytics task submitter may be a part of another analytic application such as application discovery. In one example, the analytic task submitter is a part of the analytic service. In some embodiments, the analytics service is a part of an on-premises or cloud-based infrastructure of the enterprise system.

The application-centric infrastructure management system may output one or more alarms associated with different types of entities of the enterprise network. For example, a host of the enterprise network may have alarms such as queue depth, host read/write response time, lost path, and link transmission errors. An application may have alarms such as application read/write response times. A virtual machine (VM) may have alarms such as CPU utilization, memory utilization, ESX host maximum memory state, and virtual machine CPU ready. Each alarm may be triggered by their respective alarm thresholds. Entities associated with applications of with tier of services may have different alarm thresholds for the same alarm.

The application-centric infrastructure management system may provide an alarm input interface. The IT administrator or other users of the enterprise network may interact with the alarm input interface and input values of alarm thresholds. The IT administrator may choose to enter tier alarm threshold values associated with different alarms and different tiers of service.

The application-centric infrastructure management system may send a request for virtual machine data from a software integrated into a product suite (such as VMware vSphere). The data regarding virtual machines (VMs) includes virtual machine clone count, virtual machine power on count, virtual machine power off count, and virtual machine to host mapping of the enterprise network. The application-centric infrastructure management system may analyze the virtual machine data to determine attributes including but not limited to the percent of CPU idle, CPU utilization, and CPU usage MHz.

As the name implies, a virtual machine is a computer file that behaves like a physical computer. The physical hardware running the virtual machine is referred to as a host, and the virtual machine executing on the host may be referred to as a guest. One host may execute more than one virtual machine, with each of the more than one guests emulating different operating systems (OS). The nature of virtual machines allows the IT administrator to multi-task any given physical computer host of the enterprise network instead of utilizing multiple computing hardware devices, each dedicated to a single computing task.

The application-centric infrastructure management system may assign a tier of service to any number of applications. The tier of service assigned to each application may be propagated to the entities of the enterprise network associated with each application. In the case of applications that include virtual machines, as the computing load of the application increases through its operation, the number of virtual machines and the number of hosts that runs the virtual machines assigned to the application may increase or decrease. A newly added host may be assigned the same tier of service as the associated application and thereby inheriting a tier of service of the application. This, in turn, may change the alarm thresholds that the virtual machine and the host may trigger. For example, an email application may be assigned a tier 0 application, so all entities of the enterprise network associated with the email application, such as the virtual machines, the host and the servers may also be assigned to tier 0, and therefore be subject to tier 0 alarm criteria/thresholds.

Similarly, virtual machines may be removed from applications as the computing load of the application decreases through its operation. As such, the tier of service may be changed; this, in turn, may change the alarm thresholds that the virtual machine and the host may trigger.

As discussed herein, a tier of service of an application may propagate to the entities of the enterprise network associated with the application, along with the SLA alarms and tiered alarm threshold associated with the tier of service of the application. Furthermore, the tier of service of an application, and thereby their associated entities, may determine polling intervals within a polling window for the different SLA alarms for each entity associated with the application. Rather than using a simple threshold, the application-centric infrastructure management system may use a polling interval and calculate an average metric to compare against the tiered alarm threshold. By using polling intervals, statistical fluctuations and network anomalies may be avoided, thereby reducing the instances of false alarms.

The application-centric infrastructure management system may have different polling intervals for different SLA alarms. In some embodiments, polling intervals may be determined according to the tier of service of the entity. For example, the host read-response alarm may have a host read-response alarm threshold of 30 ms and a polling window of 1 minute for all entity tiers of service. For tier 0 hosts, the polling interval, in which the host read-response time is aggregated and compared to the host read-response threshold, is 6 seconds. During the polling window of 1 minute, data points from each polling window may be aggregated and compared to the host read-response threshold. With a polling window of 6 seconds, 10 data points may be obtained; these 10 data points may be aggregated and compared with the host read-response alarm threshold to determine if the host read-response alarm may be triggered. For tier 1 hosts, the polling interval, in which the host read-response time is aggregated and compared to the host read-response threshold, is 30 seconds. With a polling window of 1 minute, 2 data points may be obtained; these 2 data points may be aggregated and compared with the host read-response alarm threshold to determine if the host read-response alarm may be triggered. For lower-tiered entities, a longer polling interval may be necessary, fewer data points are retrieved, stored, and analyzed, which allows the application-centric infrastructure management system to reserve storage and processing resources for higher-tiered entities.

FIG. 1 depicts a block diagram of an enterprise system 100 capable of providing an application-centric infrastructure management system of the enterprise network according to some embodiments. In this example, the enterprise system 100 comprises enterprise network 105 and infrastructure performance management (IPM) appliance 160. The enterprise network 105 includes a storage device 110, a host 120, a server 125, system devices 126, a switch fabric 130, and a traffic access points (TAP) 140. The IPM appliance 160 includes an application discovery system 180 and an application-centric infrastructure management system 190.

The storage devices 110 of the enterprise system 100 include one or more storage system(s) that store data. In one embodiment, the storage devices 110 include a disk array. In some embodiments, a storage device includes a storage array network (SAN). In various embodiments, the storage device is cloud storage.

The host 120 of the enterprise system 100 may include a physical computer or server which sends or receive data, services, or applications. Hosts may also be connected to other computers or servers via a network. In some examples, the host 120 may be an instance of an operating system. For example, the hosts 120 may include instances of UNIX, Red Hat, Linux and others. In some embodiments, the hosts 120 may include a physical computer managed by Microsoft Windows. Hosts 120 may include one or more virtual machines.

Server 125 may include computer software or hardware used to store network connections and store data. In some embodiments, the server 125 may be a physical computer or virtual machine which provides data to other computers.

System devices 126 may include entities of the enterprise network 105, such as third-party software platforms subscribed to by the enterprise network 105. In various embodiments, the third-party software platform includes IT management software such as ServiceNow or an application performance integration platform such as AppDynamics. ServiceNow or AppDynamics may provide an application to virtual machine mapping to the application-centrical infrastructure management system. The application to virtual machine mapping may aid the application-centric infrastructure management system in providing a real-time application to host mapping.

The switch fabric 130 may use packet switching to receive, process, and forward data from a source device to a destination device. The switch fabric 130 may include any number of switches, such as routers, bridges, or the like. The switch fabric 130 may provide communication between any two entities of the enterprise system 100, such as storage device 110, host 120, server 125, system devices 126, switch fabric 130, and TAP 140 and the IPM appliance 160.

The TAP 140 may include an optical splitter that provides a copy of data passing through a fiber optic channel without affecting the integrity of the data. The fiber optic channel may connect the storage devices 110 to the server 125. The copy of data may be used for real-time performance monitoring of data traffic traveling through the fiber optic channel. The traffic access points 140 may provide connectivity to links between storage ports of the storage device 110 and switches of switch fabric 130. In various embodiments, the TAP 140 may provide connectivity on both sides of fabric-based storage virtualizers such as cloud-based storage.

The application-centric infrastructure management system 190 is a digital device that may manage SLA alarms of dynamically tiered devices of an enterprise network. The management includes, for example, adaptive thresholding of SLA alarms, adaptive polling, and templatized remediation.

The application-centric infrastructure management system 190 may obtain real-time views of the infrastructure that is most relevant and important to the IT administrator. As entities (e.g., virtual machines and virtual servers) of the enterprise network are added or removed from an application of the enterprise network, attributes of the associated application (being executed on those virtual machines or virtual servers) may be added to or removed from the entities of the enterprise. The attributes may include a tier of service of the application, tier threshold alarm of each SLA alarm, polling interval of each of the SLA alarms, and/or an interval within the polling window to average and aggregate metrics associated with the entity of the enterprise network to determine if the SLA alarm is triggered.

The application-centric infrastructure management system 190 may manage SLA alarms by receiving a list of applications (e.g., identifying any number of applications) of the enterprise network 105. The list of applications may include entities of the enterprise network 105, which make up each application and attributes of each application. In some embodiments, the list of applications includes tiers of service associated with each application of the enterprise network. In one embodiment, the list of applications may further include attributes of the entities which make up each or any listed application.

In various embodiments, the application discovery system 180 is configured to send the list of applications to the application-centric infrastructure management system 190. In some embodiments, third party software platforms send the list of applications to the application-centric infrastructure management system 190, the third-party software platforms may include application performance software platform such as AppDynamics or IT management software such as ServiceNow. These third-party software platforms may aid in providing to the IT administrator or another user of the enterprise network 105 a real-time mapping of applications to entities of the enterprise network 105 (including, for example, storage devices 110, switch fabric 130, host 120, and the server 125).

A tier of service may be used to prioritize one application or one entity over other applications or entities in terms of criticality. In some embodiments, the enterprise network 105 may comprise four tiers, with the most important and business critical tier named "tier 0," followed by, in order of decreasing importance in this example, "tier 1," "tier 2," and "tier 3."

In one example, tier 0 may represent the most important group of applications that contribute the most to the business operations (e.g., where significant loss of revenue and impact on operation would occur if any of these processes were to go down). Tier 3 may represent applications that may not have a direct impact on overall business operations and applications whose failure may not result directly in loss of revenue. Tier 1 and 2 may represent applications of intermediate importance, tier 1 may represent applications whose failure to operate may result in loss of significant, but not critical revenue. Tier 2 may represent applications whose failure may result in minor revenue loss. The tier of service of an application may propagate to the entities associated with the application. When an entity is a member of a tier, it becomes subject to SLA alarms and tiered alarm thresholds associated with the tier. It will be appreciated that there may be any number of tiers, with any number of different types of tier identifiers (not limited to numerical value).

In some embodiments, SLA alarms and their associated tiered alarm thresholds may be applied to an application (e.g., an application instance). In some embodiments, different application instances of the same application may have different tiers (and therefore be subject to different tiered alarm thresholds). This may be the case, for example, if one instance of an application manages time critical information while other instances of the same application manages time-insensitive information.

SLA alarms associated with applications may include, for example, application read/write response times. SLA alarms may vary depending on the type of entity that the SLA alarm is associated. For example, a host of the enterprise network 105 may have SLA alarms such as queue depth, host read/write response times, lost path, link transmission errors. A virtual machine of the enterprise network may have SLA alarms such as CPU utilization, memory utilization, ESX host maximum memory state, and virtual machine CPU ready. Each SLA alarm may be triggered by any number of alarm thresholds, the alarm thresholds may be tier based. There may be different alarm thresholds associated with each SLA alarm, the values of the alarm thresholds may be based on the tier of service of the entity associated with the SLA alarm.

For example, a host associated with a tier 1 application may be referred to as a tier 1 host. The tier 1 host may have a host read alarm threshold of 30 ms, meaning that if the application-centric infrastructure management system 190 polls a read-response time greater than 30 ms, the host read alarm will be trigger. A host associated with a tier 2 application may be referred to as a tier 2 host. The tier 2 host may have a host read alarm threshold of 50 ms, meaning that if the application-centric infrastructure management system 190 polls a read-response time greater than 50 ms, the host read alarm will be trigger. In some embodiments, the application-centric infrastructure management system 190 may provide default alarm threshold values for the different types of entities, for all the tiers of services.

The application-centric infrastructure management system 190 may receive data regarding entities of the enterprise network 105 such as virtual machines, hosts, and servers from integrated software such as VMware vSphere. vSphere may provide to the application-centric infrastructure management system 190 a host to virtual machine mapping. With this information from vSphere, the application-centric infrastructure management system 190 may provide a real-time application to host mapping.

In addition to dictating the SLA alarm and the tiered alarm threshold associated with the SLA alarm, the application tier of service, and therefore the entity tier of service of entities of the enterprise network 105, the application tier of service may also determine polling intervals within a polling window that is used to measure metrics associated with the various SLA alarms. Without the use of polling windows and polling intervals, statistical fluctuations and network anomalies may result in false alarms. Furthermore, by averaging or aggregating measured data over a polling window, the processing load of an analysis module of the application-centric infrastructure management system 190 may be eased. Some of the metrics that are used include read-response time, write-response time, and fabric buffer to buffer credit. Different entities of the enterprise network 105 may have different metrics. For example, an entity of the switch fabric, such as a router has a metric such as fabric buffer to buffer credit, while a host has a metric such as read-response time.

For example, a network attached storage device (NAS) average write completion alarm for a storage controller may be a tiered according to a storage device. The number of write input/output operations per second (IOPS) may have an alarm threshold of 100 for all storage devices of all tier of services. The average write completion threshold for all storage devices of all tier of services may be 20 ms. For storage controllers of tier 0 storage devices, the polling interval may be 1 minute. The NAS average write completion alarm may be triggered when the NAS average write completion time exceeds the average write completion threshold of 20 ms for storage controllers with IOPS threshold of 100 for the polling interval of 1 minute. For storage controllers of tier 1 storage devices, the polling interval may be 5 minutes. The NAS average write completion alarm may be triggered when the NAS average write completion time exceeds the average write completion threshold of 20 ms for storage controllers with IOPS threshold of 100 for the polling interval of 5 minutes. In this example, the average write completion threshold is the same for all storage controllers of all tier of services, however, the length of time in which the average write time needs to be exceed the threshold before the alarm is trigger is longer.

The application-centric infrastructure management system 190 may output alarm notifications based on an alarm event. An alarm event may occur when an alarm has been triggered. The application-centric infrastructure management system 190 may organize multiple open cases by entity or by tier. Each open case may represent multiple instances of the same SLA alarm. An example output interface 1000 may be seen in FIG. 10. The application-centric infrastructure management system 190 may display to the IT administrator the open cases. Area 1010 of the output interface 1000 may display open cases organized by entity type, while area 1020 may display open cases organized by tier.

Figure 2:
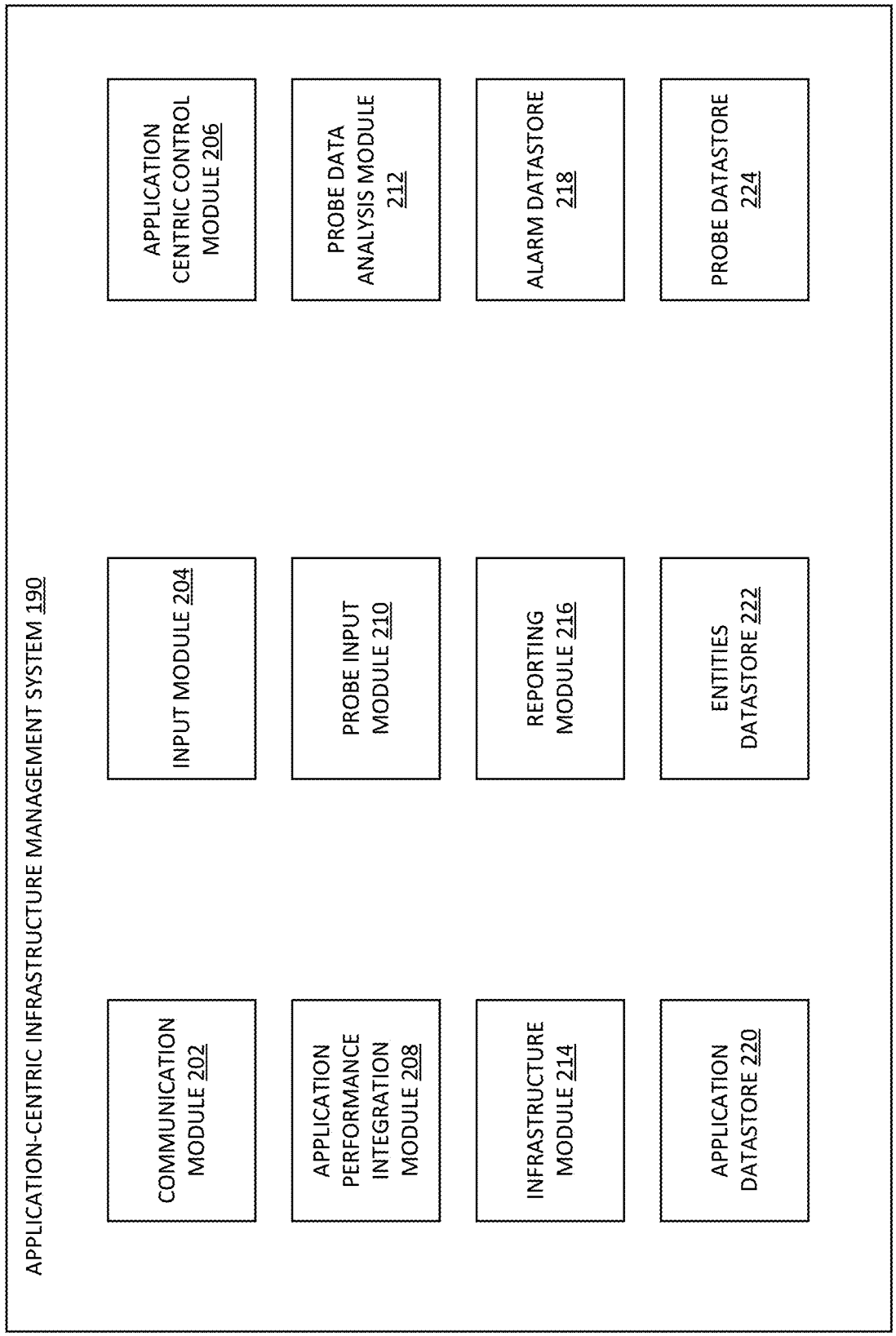
FIG. 2 depicts a block diagram of an example of an application-centric infrastructure management system according to some embodiments.

FIG. 2 depicts a block diagram of an example of an application-centric infrastructure management system 190 according to some embodiments. Application-centric infrastructure management system 190 includes a communication module 202, an input module 204, application-centric control module 206, an application performance integration module 208, a probe input module 210, a probe data analysis module 212, an infrastructure module 214, a reporting module 216, an alarm datastore 218, an application datastore 220, an entities datastore 222, and a probe datastore 224.

The communication module 202 may send and receive requests or data between any of the application-centric infrastructure management system 190 and components of the enterprise network 105. The communication module 202 may send a list of applications to the application-centric control module 206. The communication module 202 may receive a request to send the list of applications from the IT administrator or another user of the enterprise network. The list of applications may include information regarding applications of the enterprise network 105 as well as attributes of applications. The list of applications may further include entities of the enterprise network 105 which make up each of any number of applications and attributes of each of any number of entities. In some embodiments, the list of applications further includes a tier of service associated with each application of the enterprise network 105.

In some embodiments, the communication module 202 may receive the request to send the list of applications from the application discovery system 180. In various embodiments, the communication module 202 may receive the request to send the list of applications from an IT management software such as ServiceNow or an application performance integration platform such as AppDynamics. The input module 204 may receive the list of applications from the IT management software or the application performance integration platform.

The communication module 202 may send a request to the application datastore 220 to create and store any number of application entries. Each application entry may be associated with an application from the list of applications. The application entry may include attributes of the application such as a name of the application, a tier of service of the application, and/or a name of any number of entities which make up the application. In various embodiments, the application entry includes a tier of service and/or a polling interval to the application instance associated with the application entry. In some embodiments, each application entry includes metrics of the application instance associated with the application entry.

The communication module 202 may send a request to the reporting module 216 to output a tier of service input interface. The IT administrator or other user of the enterprise network 105 may input the tier of service of an application or an entity of the enterprise network 105. The communication module 202 may receive a request from the reporting module 216 to update an application entry in response to an interaction of a field of example tier of service input interface 800 of FIG. 8. The communication module 202 may send the received request from the reporting module 216 to the application datastore 220 to update the application entry.

The communication module 202 may receive a request to create or update an alarm entry from the application-centric control module 206. The communication module 202 may send the request create or update the alarm entry to the alarm datastore 218.

The communication module 202 may send a request to software integrated in a product suite such as VMware vSphere for virtual machine data. The virtual machine data includes virtual machine to host mapping, virtual machine clone count, virtual machine power on count, virtual machine power off count, and/or the like. The communication module 202 may send a request to entities datastore 222 to create or update one of any number of virtual machine entries. Each virtual machine entry may represent a virtual machine of the enterprise network 105 and may include attributes of the virtual machine. The communication module 202 may receive the virtual machine data from the entities datastore 222.

The communication module 202 may send a request to the application-centric control module 206 to analyze the virtual machine data to determine attributes of the virtual machine data. Attributes of the virtual machine data may include, but is not limited to, any or all of the following: a tier of service of the virtual machine, a percent CPU idle, a percent CPU idle, a CPU utilization, and/or a CPU usage MHz. The communication module 202 may send a request to probe datastore 224 to update attributes of the virtual machine entries stored in the probe datastore 224.

The communication module 202 may update the tier of service of entities of the enterprise network 105, including virtual machines with the tier of service of the application associated with each of the entities.

The communication module 202 may send a request to the alarm datastore 218 to create or update one of any number of alarm entries. Each of any number of alarm entries may include, but are not limited to, attributes of the alarm such as name of the property or metric being measured by the alarm, a tier of service, a polling window, a polling interval, and/or an alarm count.

Different entities of the enterprise network 105 may be associated with different alarms. For example, a host may have alarms measuring attributes such as queue depth, host read-response time, host write response time, and link transmission errors. An application may have alarms measuring application write response time and application read-response time. A virtual machine may have alarms such as CPU utilization, memory utilization, ESX host maximum memory state, and/or virtual machine CPU ready. A switch may have alarm measure fabric buffer credits. In some embodiments, there may be different alarm entries for different tiers of service of the same metric. For example, there may be a tier 0 host read-response alarm entry, a tier 1 host read-response alarm entry, and a tier 2 host read-response alarm entry.

The input module 204 may receive the list of applications from a variety of sources. The variety of sources include the IT administrator or another user of the enterprise network 105, the IT management software, the application performance integration platform or the application discovery system 180.

The input module 204 may receive information from IT administrator of the enterprise system 100. The received information may include a list of applications known to the user. The received information may include a list of entities of the enterprise network 105, and attributes associated with entities of the enterprise network 105 such as a network tier associated with the entity, name of the entity or type of entity. In some embodiments, attributes associated with entities of the enterprise network 105 may be different depending on the type of entity. Entities of the enterprise network 105 represent the physical and virtual entities of the enterprise network, and may include applications, compute devices, network elements, and/or storage elements.

The input module 204 may receive virtual machine data from any number of virtual machine data probes integrated within the enterprise network 105. In some embodiments, any number of virtual machine data probes may be a part of software integrated in a product suite such as VMware vSphere. The virtual machine data includes virtual machine data which indicates the application instances of the enterprise network 105 running on the virtual machine associated with the virtual machine data. In various embodiments, the virtual machine data includes virtual machine identifiers, the virtual machine identifiers identifying a virtual machine of the enterprise network 105 executing at least one application instances.

In some embodiments, the input module 204 may receive from the IT administrator or other user of the enterprise network 105 a change ticket to the IT management software platform, or the application performance integration platform in response to the output of alarm notifications. The change ticket includes at least one change to one or more entities of the enterprise network 105 or one or more connections between entities of the enterprise network 105.

The application-centric control module 206 may receive the list of applications from the IT admin via the input module 204. In various embodiments, the application-centric control module 206 may receive the list of applications from the application discovery system 180. In some embodiments, the application-centric control module 206 may receive the list of application from an IT management software. In some embodiments, the list of applications includes application data. The application data include attributes of the application such as an application identifier, a tier of service of the application, an application metrics, an application polling interval, a name of the application and entities of the enterprise network 105 which make up the application. The application identifiers identifying an application instance of the enterprise network 105. The application-centric control module 206 may analyze the list of applications to identify the application data.

In some embodiments, the application-centric control module 206 may send a request to the application datastore 220 to create an application entry. The application entry may include attributes of the application. In some embodiments, the application-centric control module 206 is configured to determine a tier of service for the application instances. The application-centric control module 206 to send a request to the application datastore 220 to update the tier of service of one or more application instance.

The application-centric control module 206 may analyze the received application data to determine a tier of service of the application instances of the enterprise network 105. For example, the application-centric control module 206 may send a request to the application datastore 220 to update a tier of service field of the application entry to the tier of service determined by the application-centric control module 206.

In various embodiments, the application-centric control module 206 is configured to assign the tier of service to application instances of the enterprise network 105 as well as to the virtual machine executing a particular application. In some embodiments, a request to the entities datastore 222 is sent to update the tier of service field of the entity entries associated with the virtual machine executing the particular application.

The application-centric control module 206 may assign at least one polling interval to the application instance based on the application instance's assigned tier of service. The polling interval indicating a time when metrics are retrieved from that particular application instance. The application-centric control module 206 may accomplish this by sending a request to the application datastore 220 to update the polling interval field of one or more application entries.

The application-centric control module 206 may retrieve metrics from application datastore 220 corresponding to each application instance at the determined time interval. In some embodiments, the application-centric control module 206 may retrieve metrics from the application performance integration module 208.

The application-centric control module 206 may send a request to the entities datastore 222 to create or update an entities entry. The entities entry may include attributes of the entry such as name of the entry, tier of service of the entity associated with the entity entry, names of applications associated with the entity, polling interval associated with the entity, metric threshold associated with the entity.

In some embodiments, the application-centric control module 206 may analyze the virtual machine data received from the probe datastore 224. The analysis of the virtual machine data may include, but is not limited to, determining a mapping that maps each of any number of virtual machines to one of the hosts of the enterprise network 105 executing that virtual machine. The application-centric control module 206 may send a request to the entities datastore 222 to create or update an entity entry associated with the virtual machine based on a host to virtual machine analysis. Similarly, the application-centric control module 206 may send a request to the entities datastore 222 to create or update an entity entry associated with the host based on the virtual machine to host analysis.

The virtual machine to host mapping of one of more applications may change as application instances are added or removed. For example, the email application 502 of FIG. 5 may include email application instance 510. The email application instance 510 includes a host 512 executing a virtual machine 514. When the application-centric control module 206 analyzes the virtual machine data received from the probe datastore 224 and determines that the virtual machine 514 is being executed on the host 512, the application-centric control module 206 may send a request to the entities datastore 222 to update the entity entry associated with the virtual machine 514 to map to the host 512. Furthermore, the application-centric control module 206 may send a request to the entities datastore 222 to update the entity entry associated with the host 512 to map to the virtual machine 514.

The application-centric control module 206 may assign the tier of service of each virtual machines of the enterprise network 105 to the host executing the virtual machine. The application-centric control module 206 is configured to send a request to the entities datastore 222 to update a tier of service field of the entities entry associated with the host 512 with a tier of service field of the entity entry associated with the virtual machine 514.

Figure 5:
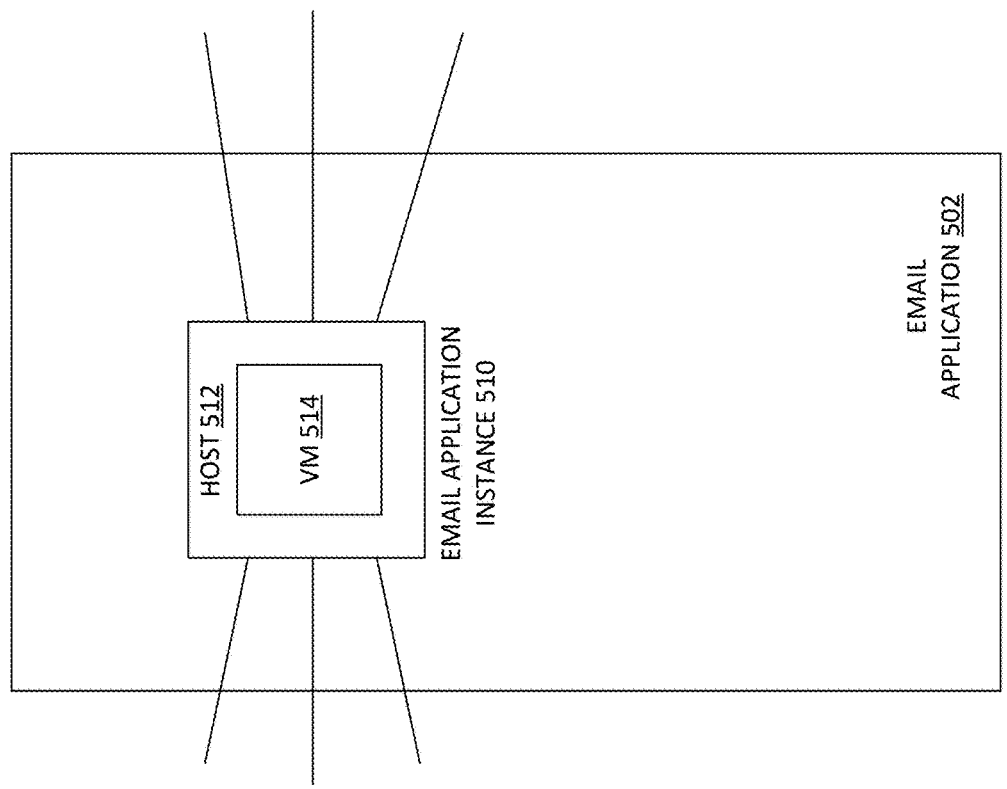
FIG. 5 depicts an example infrastructure of an email application of the enterprise network during a first time period according to some embodiments.

The application-centric control module 206 may assign at least one polling interval to each virtual machine based on that particular virtual machine's assigned tier of service. Each polling interval indicates a time when metrics are retrieved from that particular virtual machine. The application-centric control module 206 is configured to send a request to the entities datastore 222 to update a polling interval of the entity entry associated with virtual machine 514. The polling interval of the virtual machine 514 may be based on its tier of service. Assuming that the email application 502 of FIG. 5 is a tier 0 application, the host 512 and the virtual machine 514 may also be assigned a tier of service of tier 0.

The application-centric control module 206 may send a request to the probe input module 210 to retrieve metrics from each virtual machine of the enterprise network 105 at their assigned polling interval. Different metrics of the same virtual machine may be retrieved at different polling intervals. The same metrics of virtual machines executing applications of different tiers may be assigned different polling intervals. In some embodiments, the probe input module 210 (discussed herein) retrieves probe data at a rate that is not related to the polling interval of the associated entity.

The probe input module 210 may store the retrieved probe data in the probe datastore 224. The application-centric control module 206 may retrieve the probe data in the probe datastore 224 at a time interval that corresponds with the polling interval of that particular metric. For example, the probe input module 210 may store probe data received from the probes into probe datastore 224 for any number of entities of the enterprise network 105. The application-centric control module 206 may determine that a particular metric of the polling interval of a tier 0 virtual machine is 1 minute polling interval. The probe data analysis module 212 may retrieve or poll the virtual machine data relating to the particular metric of a particular tier 0 virtual machine at 1 minute intervals. By storing the retrieved probe data in the probe datastore 224, the application-centric control module 206 may be able to determine an ideal polling interval of a particular metric. For the same polling window, a smaller polling interval may result in a more accurate view of the particular metric, but would require more processing power than for a larger polling interval. For example, if for a read-response has a polling window of 1 hour and a smallest polling interval of 1 second. Through multiple trials retrieving probe data at different polling intervals using the probe data stored in the probe datastore 224, a polling interval of 10 minutes may be determined. The probe input module 210 stores the retrieved probe data in the probe datastore 224, so the 10 minute polling interval represents a 99% storage use of the probe datastore 224. The 10 minute polling interval also represents a balance between obtaining an accurate view of the read-response metric and resources of the application-centric control module 206 required to store and process the retrieved probe data.

The application-centric control module 206 may assign at least one polling interval to each host of the enterprise network 105. The assigning of the polling intervals may be based on that particular host's assigned tier of service. The polling interval indicates a time when metrics are retrieved from that particular host. The application-centric control module 206 may accomplish this by sending a request to the entities datastore 222 to update the polling interval field of entity entries associated with each of the hosts. Different metrics of the same host may be retrieved at different polling intervals, and the same metrics of hosts executing application of different tiers may be assigned different polling intervals.

In some embodiments, the application-centric control module 206 may calculate the polling interval of a host which virtual machines of different tiers of service. For example, even for the same metric, a tier 0 virtual machine may have a polling interval that is different from a tier 3 virtual machine. If both of these virtual machines are executed on the same host, the polling of metrics for each virtual machine needs to be prioritized and determine an aggregate polling interval which represents a balance between the tiers of service executed on the host and the resources of the application-centric control module 206 required to store and process the probe data.

The application-centric control module 206 may send a request to the probe input module 210 to retrieve metrics from each of any number of hosts of the enterprise network 105 at their assigned polling interval. In some embodiments, the probe input module 210 may retrieve metrics of any number of hosts from the probe datastore 224. In various embodiments, the probe input module 210 may retrieve metrics of any number of hosts from the probes of the enterprise network 105. In some embodiments, the probe input module 210 is configured to retrieve probe data, including metrics from the various entities of the enterprise network 105 serviced by the probes of the enterprise network 105 at a retrieval rate that is not related to the polling interval of the associated entity. The probe input module 210 may store the retrieved probe in the probe datastore 224. The application-centric control module 206 may retrieve metrics from the probe datastore 224 with a time stamp which corresponds to the polling interval of that particular metric. In some embodiments, the probe includes software probes which establish Windows (WMI) and Linux (SSH) credential sets for specific hosts.

The application-centric control module 206 may compare metrics received from entities of the enterprise network 105 with their respective tier metric thresholds. The entities of the enterprise network 105 may include, but is not limited to, hosts, servers, virtual machines, and/or applications. In various embodiments, entities of the enterprise network 105 include the fabric switch. Metrics of the switch fabric including fabric buffer to buffer credits.

For example, applications may have metrics such as application read-response time, and application write response times. Applications of different tiers of service may be subject to different tier metric thresholds. For example, a tier 0 application may have an application write response threshold of 10 ms, while a tier 1 application may have an application write response threshold of 15 ms.

The application-centric control module 206 may determine that the alarm trigger condition is satisfied. The determination may be based on comparison between metrics from any of the entities of the enterprise network 105 that exceeds their associated tier metric threshold. In response to satisfying the alarm trigger, the application-centric control module 206 may trigger an alarm event to the alarm datastore 218.

The application-centric control module 206 may perform any of these operations manually (e.g., by a user interacting with a GUI) and/or automatically (e.g., triggered by one or more of the modules 208-216, discussed herein). In some embodiments, the application-centric control module 206 comprises a library of executable instructions, which are executable by one or more processors for performing any of the aforementioned management operations. Like the other modules described herein, some or all of the functionality of the application-centric control module 206 may be implemented and/or included within one or more other modules and/or systems.

The application performance integration module 208 may receive from the input module 204 application data. Application data include, but is not limited to, applications or business services discovered by an application performance software platform such as AppDynamics. In some embodiments, the application performance integration module 208 may receive application identifiers or business service identifiers directly from the application performance software platforms subscribed to by the enterprise network 105. The enterprise network 105 may subscribe to an application performance software platform to monitor some or all of the entities of enterprise network 105. The IT administrator or other user of the enterprise network 105 may choose to subscribe to monitor entities associated with mission critical applications. The application performance integration module 208 may provide the application data to the application datastore 220.

In various embodiments, application performance integration module 208 is configured to receive from the input module 204 applications or business services discovered by other application performance software platforms.

The probe input module 210 may retrieve virtual machine data from software probes of the enterprise network 105. In some embodiments, the software probes are configured to request software integrated in the product suite such as VMware vSphere for virtual machine data. In various embodiments, the virtual machine data includes virtual machine identifiers. The virtual machine identifiers may identify a virtual machine of any number of virtual machines of the enterprise network 105 executing an application instance of the enterprise network 105. In some embodiments, the probe input module 210 includes software probes which establish Windows and Linux credential sets for specific hosts.

The probe input module 210 may send a request to the probe datastore 224 to store the retrieved virtual machine data. In some embodiments, the probe input module 210 may send the retrieved virtual machine data.

The probe data analysis module 212 may receive probe data from the probe input module 210. In some embodiments, the probe data analysis module 212 is configured to analyze the application data or virtual machine data to determine attributes of the application or virtual machine data respectively. The application data including attributes of the application such as application identifiers, tier of service of the application, application metrics, and/or application polling interval. The application identifiers may identify an application instance of the enterprise network 105. The attributes of the virtual machine data include, but is not limited to, percent CPU idle, CPU utilization, and/or CPU usage MHz. In some embodiments, the virtual machine data includes virtual machine identifiers. The virtual machine identifiers may identify a virtual machine executing an application instance of the enterprise network 105.

The probe data analysis module 212 may determine the virtual machine to host mapping of the enterprise network 105. The virtual machine to host mapping of one of more applications may change as application instances are added or more, thereby changing the tier of service and the polling interval of one or more virtual machines and hosts of the enterprise network 105.

The infrastructure module 214 may determine the infrastructure of the enterprise network 105. The infrastructure module 214 may aid users of IPM appliance 160 with a visual representation of the infrastructure in the context of applications of the enterprise.

In some embodiments, the determination of the infrastructure of the enterprise network 105 is optional. In addition to discovering the entities of the infrastructure, the attributes of the entities of the enterprise network 105 within the infrastructure may also be discovered.

Figure 8:
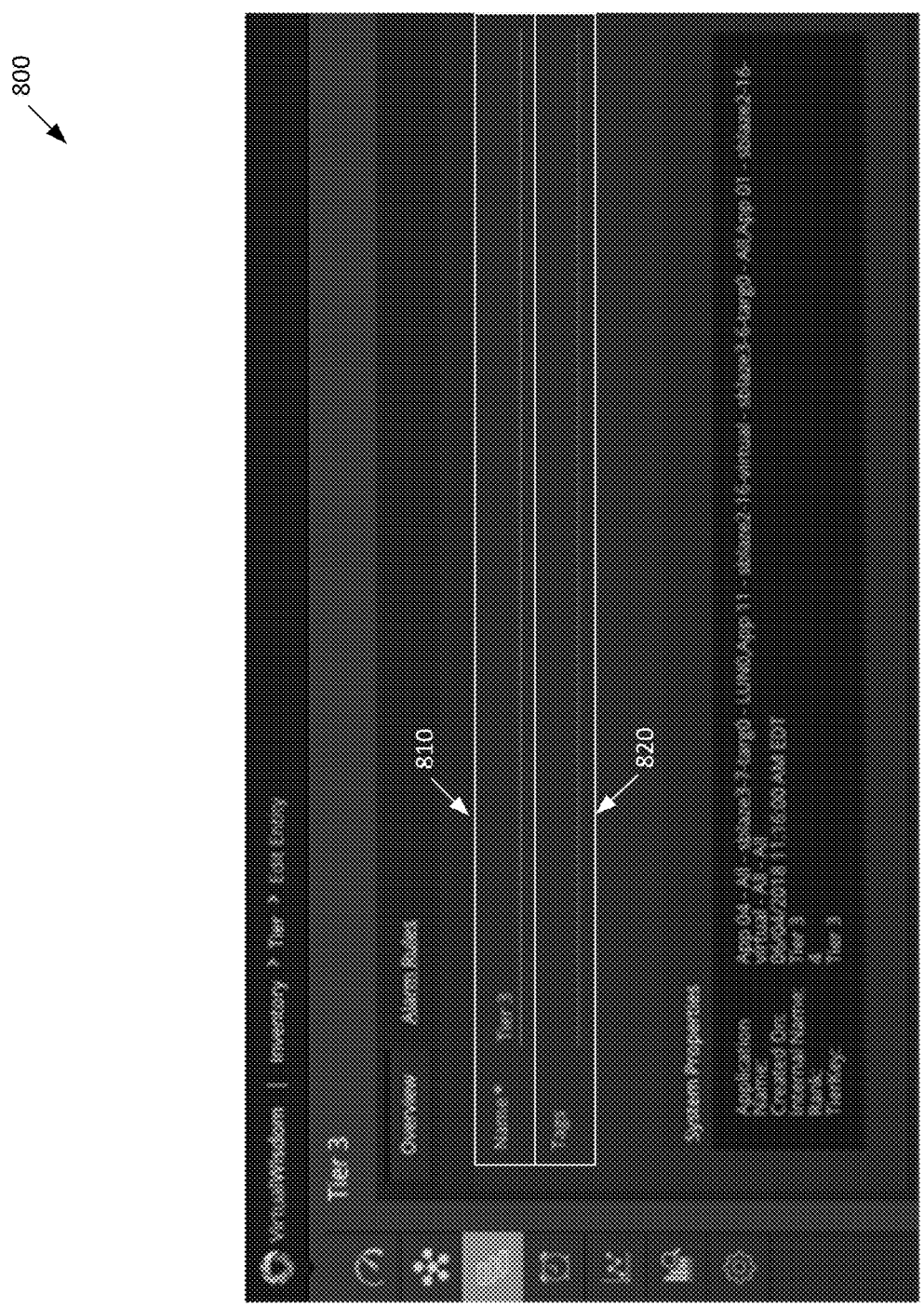
FIG. 8 depicts an example tier of service input interface according to some embodiments.

The reporting module 216 may output the tier of service input interface, such as example tier of service input interface 800 of FIG. 8. The IT administrator of the enterprise network 105 may interact with the field 810 and enter a name for an entity of a particular application. In some embodiments, the IT administrator may interact with field 820 and enter tags or keywords associated with the entity.

In some embodiments, the reporting module 216 may receive a request to output an alarm notification from the application-centric control module 206. The reporting module 216 may output templatized remediations, the templatized remediation includes ways to resolve an alarm.

In various embodiments, the reporting module 216 may manage alarms by the case, with multiple instances of the same alarm track against an original case until it is closed, enabling the user of the enterprise network 105 to view trends and assess the urgency. To minimize distractions and interruptions to the IT administrator or another user of the enterprise network 105, if the same types of alarms are triggered within a predetermined interval, they are combined into a single notification. The notification including email, text message, phone call or other forms of communication to the IT administrator or another user of the enterprise network 105. The tier of service associated with the alarm may determine the type of notification sent to the designated user of the enterprise network 105. For example, the triggering of a tier 3 alarm may result in a pop-up window in the alarm output interface, while the triggering of a tier 0 alarm may result in the pop-up window in the alarm output interface as well as an email sent to the designated user of the enterprise network 105.

Figure 9:
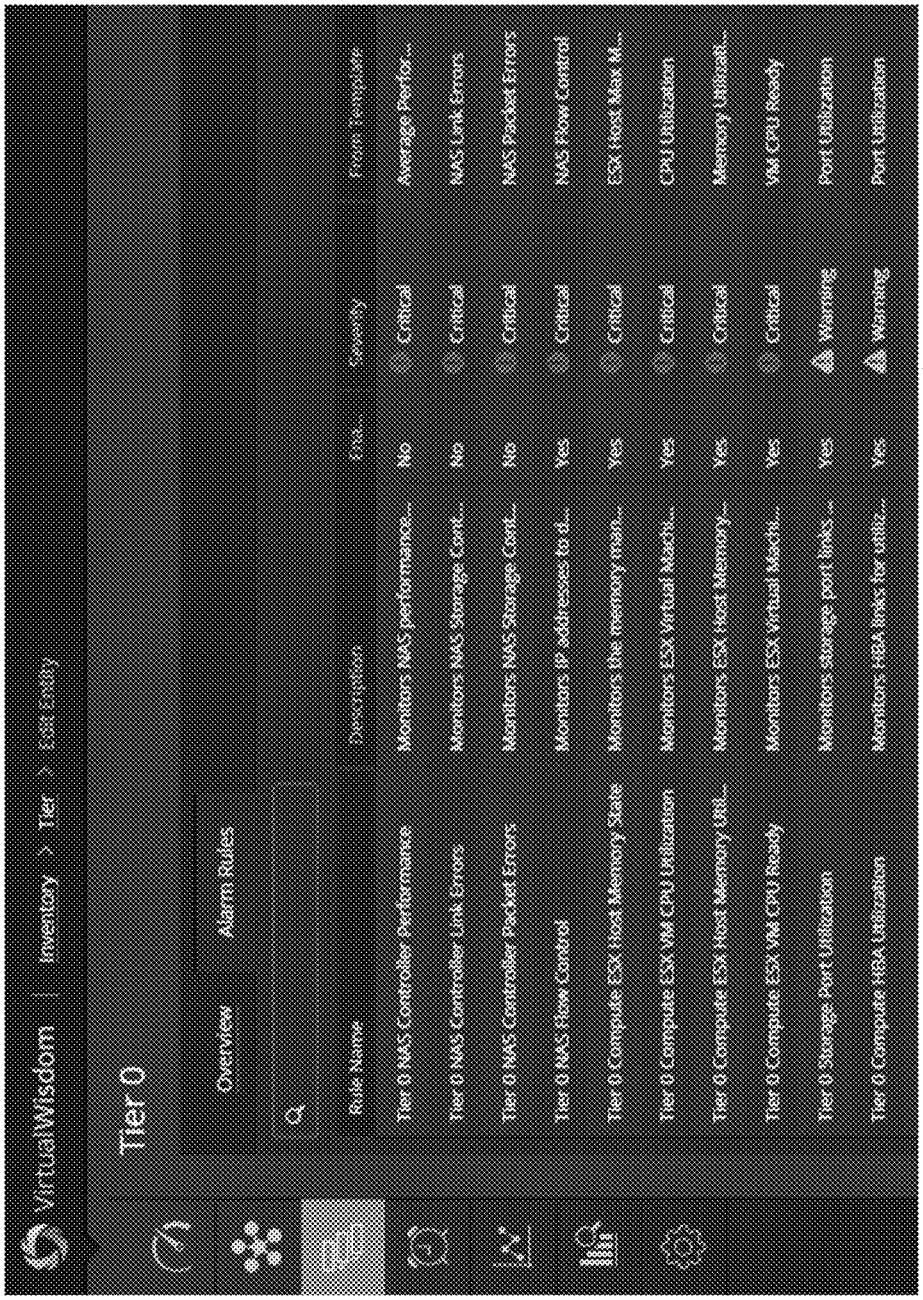
FIG. 9 depicts an example alarm event output organized by tier according to some embodiments.

The reporting module 216 may organize alarm events by entity or by tier. An example alarm event output interface 900 of FIG. 9 organizes alarm events by tier. By organizing alarm events by tiers, the IT administrator may prioritize alarm events associated with entities of the enterprise network executing higher priority applications. The alarm event output interface 900 may list information regarding each alarm event such as the name of the alarm, a brief description, severity, and the entity of the enterprise network 105 the alarm is triggered by.

For example, the application-centric control module 206 determines that a particular tier 0 host of the enterprise network 105 has a read-response metric of 32 ms, this triggers a tier 0 host read-response alarm, since 32 ms is greater than the tier 0 host read-response threshold of 30 ms. The application-centric control module 206 may send a request to the reporting module 216 to output an alarm notification based on the alarm event. Until the tier 0 host read-response is resolved, subsequent triggering of the same alarm event on the particular tier 0 host will track against the alarm notification outputted by the reporting module 216.

The alarm datastore 218 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the alarm datastore 218 may receive the alarm event from the application-centric control module 206. In response to receiving the alarm event, the alarm datastore 218 may create or update one of any number of alarm entries. Each of any number of alarm entries include, but is not limited to, attributes of the alarm such as name of the property being measured by the alarm, polling window, polling interval, and/or alarm count. Alarms may be managed on an entity by entity basis in terms of a case. Multiple instances of the same alarm track against the original case until it is close. For example, the application-centric control module 206 may determine that a tier 0 host triggers the host read-response alarm threshold of 30 ms during the polling window of 1 minute. In response to the triggering of this alarm, the alarm module datastore may receive a request to increment the alarm count.

In various embodiments, each alarm entry includes a tier metrics threshold, with different tiers of the same metric having different thresholds. An alarm trigger condition may be satisfied if the metric associated with a particular entity of the enterprise network exceeds the tier metrics threshold. When the alarm trigger is satisfied based on the comparison between metrics from one or more entities of the enterprise network 105, including virtual machines and hosts, and the associated tier metric threshold, application-centric control module 206 may send a request to output an alarm notification. The request to output the alarm notification may be sent to the reporting module 216. For example, a tier 0 host read-response threshold may be 30 ms, while a tier 1 host read-response threshold may be 50 ms. An alarm trigger condition may be satisfied if the host read-response of a tier 0 host exceeds 30 ms.

Any given alarm may have different alarm thresholds, different sized polling windows or polling intervals depending on the tier of service associated with the alarm. For example, a tier 0 switch may have a fabric buffer to buffer alarm which may trigger if the buffer credit starvation exceeds an alarm threshold of 20% during a polling interval of 5 minutes. A tier 1 switch may have a fabric buffer to buffer alarm which may trigger if the buffer credit starvation exceeds an alarm threshold of 40% during the polling interval of 5 minutes.

The alarm datastore 218 may send a request to the application-centric control module 206 to send an alarm notification when the alarm trigger condition is satisfied. The notification may be in the form of pop-up window in the application-centric infrastructure management system 190, an email or text sent to designated users of the enterprise network 105 or a phone call to the designated user of the enterprise network 105. In some embodiments, if multiple alarms trigger on one entity of the enterprise network during a particular interval, the application-centric control module 206 may group any number of alarms into one notification. In various embodiments, if multiple entities of the enterprise network 105 of the same tier of service trigger the same alarm during a particular interval, the application-centric control module 206 may group the notification of multiple instances of the same alarm of the same tier of service over the multiple entities of the enterprise network 105.

The application datastore 220 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the application datastore 220 receives a request to create and store one or more application entries. The application entry may include attributes of the application such as a name of the application, a tier of service of the application, and/or the names of entities which make up the application. In some embodiments, the application entry includes application identifiers. The application identifier may identify any number of application instances of the enterprise network 105. Each application of the enterprise network 105 may include at least one application instance. In various embodiments, the application entry includes a tier of service and/or a polling interval to the application instance associated with the application entry.

The entities datastore 222 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The entities datastore 222 may receive the request from the communication module 202 for virtual machine data. In response, the entities datastore 222 may send the virtual machine data to the application-centric control module 206.

The entities datastore 222 may create and store the virtual machine data in the form of an entity entry. The entity entry may represent an entity of the enterprise network 105. Entities of the enterprise network 105 including hosts and virtual machines. The entity entry may include attributes of the entry such as a name of the entry, a tier of service associated with the entity entry, the names of applications associated with the entity, a polling interval associated with the entity, and the tier metric threshold associated with the entity.

The probe datastore 224 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the probe datastore 224 is configured to receive probe data from the probe input module 210.

A module may be hardware or software. In some embodiments, the module may configure one or more processors to perform functions associated with the module. Although different modules are discussed herein, it will be appreciated that the application discovery system 180 may include any number of modules performing any or all functionality discussed herein.

Figure 3:
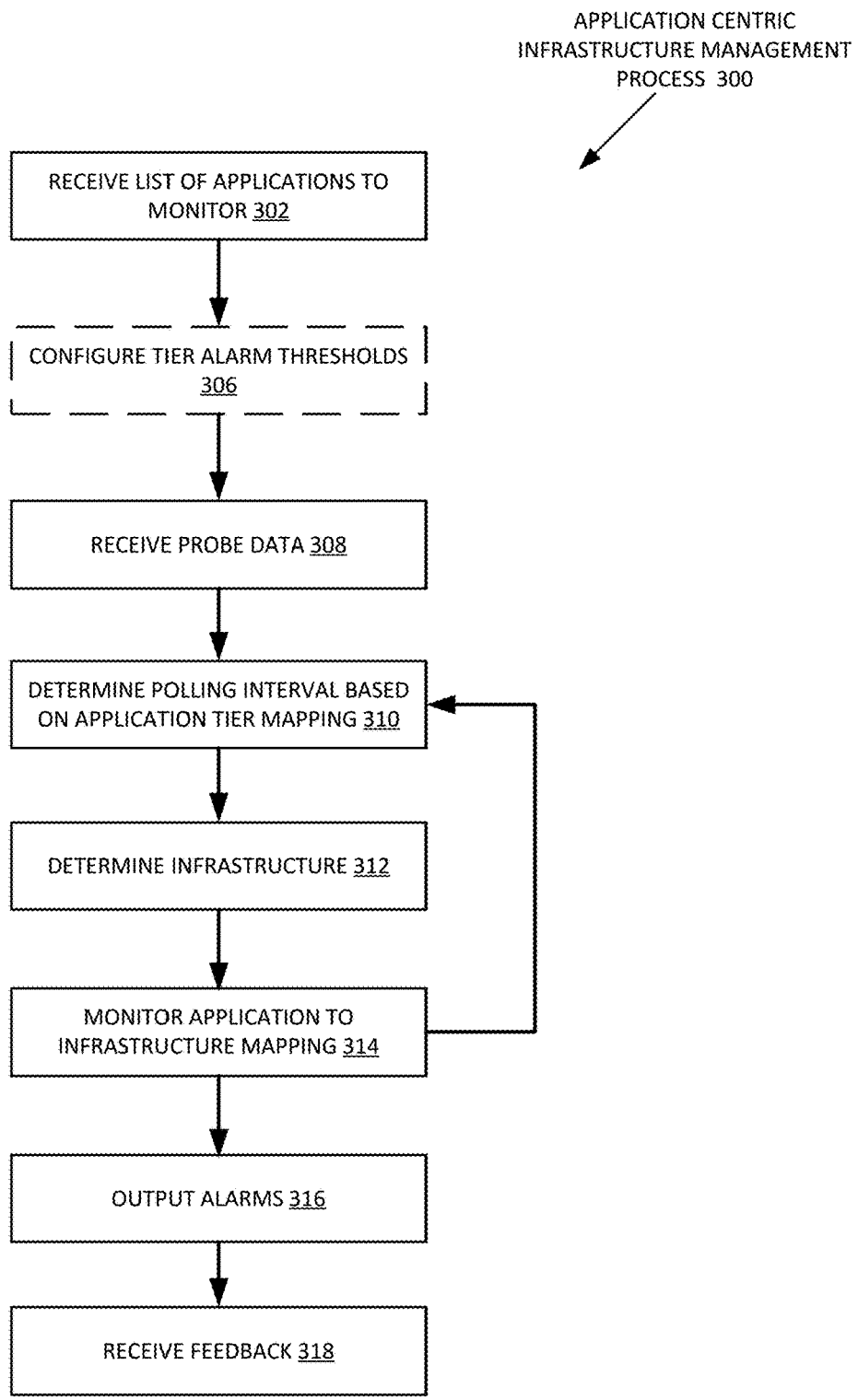
FIG. 3 depicts a flowchart of an application-centric infrastructure management process according to some embodiments.

FIG. 3 depicts a flowchart of an application-centric infrastructure management process 300 according to some embodiments. In step 302, the input module 204 may receive information from the IT administrator or other user of the enterprise network 105.

The received information may include a list of applications known to the user. The received information may include a list of entities of the enterprise network 105, and attributes associated with entities of the enterprise network 105 such as a network tier associated with the entity, name of the entity or type of entity. In some embodiments, attributes associated with entities of the enterprise network 105 may be different depending on the type of entity. Entities of the enterprise network 105 represent the physical and virtual entities of the enterprise network 105, and may include applications, storage devices, hosts and elements of a switch fabric.

The input module 204 may receive the list of applications from an IT management software such as ServiceNow or an application performance integration platform AppDynamics.

The reporting module 216 may output the number of applications assigned to each of a tier of service. The number of tiers of service may be determined by the IT administrator of the enterprise network 105. The IT administrator may interact with an example tier of service interface 700. The rows of the example tier of service interface 700 outputs the number of applications in each of the four tiers of service in an example enterprise network.

Figure 11:
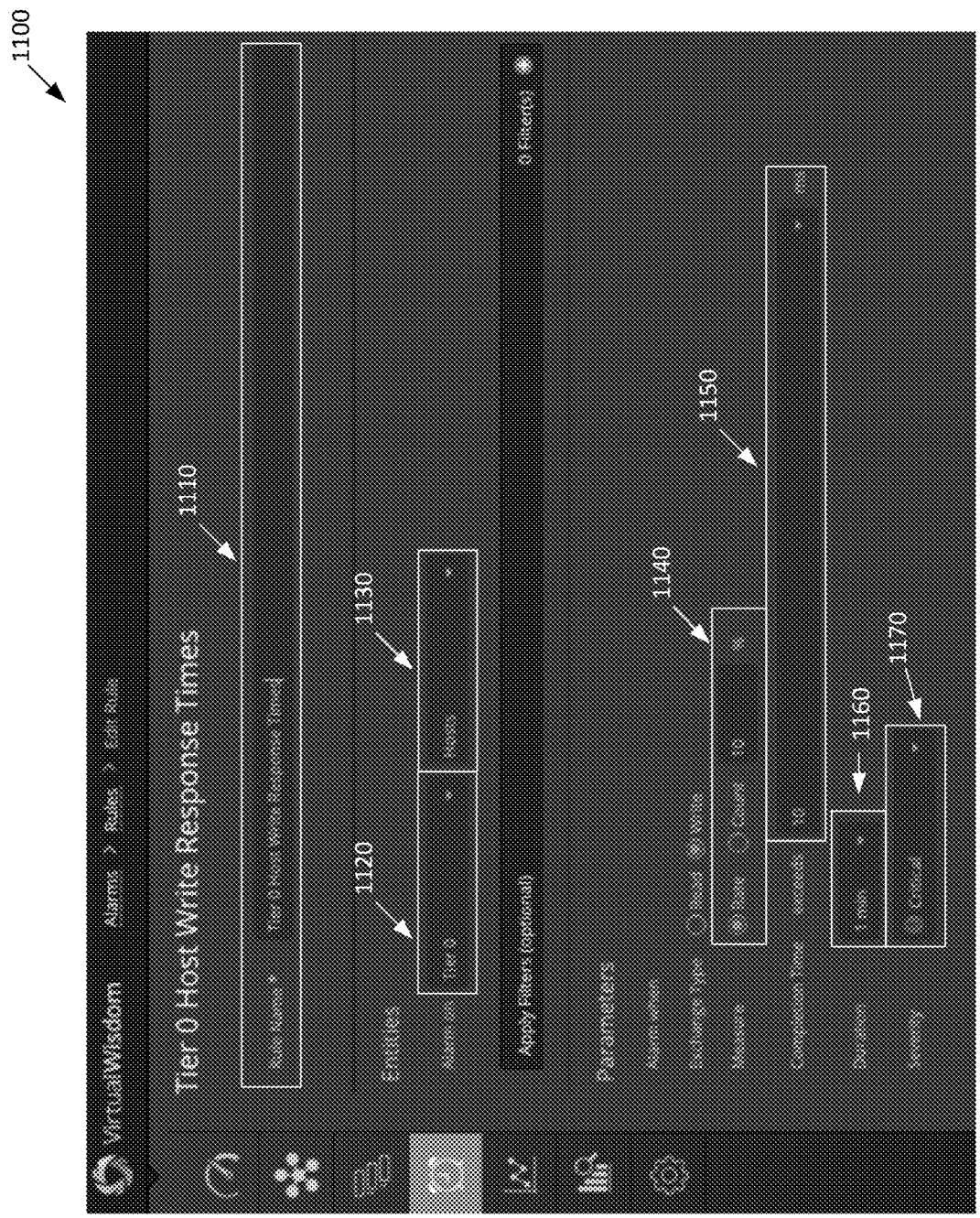
FIG. 11 depicts another example alarm input interface according to some embodiments.

In optional step 306, the reporting module 216 may output an alarm input interface, such as an example alarm input interface 1100 of FIG. 11. The IT administrator may choose to interact with the fields of the alarm input interface to customize one or more components of tier metrics alarms. The components of the tier metric alarms include a name of the tier metric alarm, types of entities to apply the tier metric alarm, a polling interval and a severity of the tier metric alarm. For example, the alarm input interface 1100 displays a tier 0 host write response alarm, the IT administrator may choose to customize the name of the alarm by interacting with field 1110.

The IT administrator may choose to interact with pull down menu in area 1120 to specify the tier of service of the host write response alarm. In some embodiments, the application-centric infrastructure management system may default the tier of service of the host write response alarm to '0', or the most important rank.

The IT administrator may choose to interact with pull down menu in area 1130 to specify a type of entity of the enterprise network 105 to apply to the host write response alarm. The type of entity including application, host, network, and storage.

The IT administrator may interact with field 1140 to specify a type of measurement for the alarm. Pull down field 1150 may specify a quantity to the tier metric alarm. The IT administrator may interact with pull down field 1160 to specify a polling window of the tier metric alarm. The polling window representing any number of polling intervals.

The IT administrator may interact with field 1170 to specify the severity of the tier metric alarm. The severity of the tier metric alarm may determine the type of notification outputted by the reporting module 216. For example, an alarm with a critical alarm may be associated with a tier 0 device which requires immediate attention. The reporting module 216 may output a pop-up window in the alarm output interface, and the communication module 202 may send an email to the designated user of the enterprise network 105 notifying the designated user of the critical alarm.

In step 308, the input module 204 may receive virtual machine data from any number of virtual machine data probes integrated within the enterprise network 105. In some embodiments, any number of virtual machine data probes may be a part of software integrated in a product suite such as VMware vSphere. The virtual machine data includes virtual machine data indicating the virtual machines of the enterprise network 105 and the application instances being executed on them. In various embodiments, the virtual machine data includes virtual machine identifiers, the virtual machine identifiers identifying a virtual machine of any number of virtual machines of the enterprise network 105 executing at least one of any number of application instances.

The input module 204 may send a request to the probe datastore 224 to store the virtual machine data.

In step 310, the application-centric control module 206 may determine the polling interval of an entity of the enterprise network 105. The polling interval of the entity is determined by the tier of service of the associated entity. For entities of the enterprise network 105 such as hosts which executes more than one virtual machine of different tiers of service, an aggregate polling interval needs to be calculated.

Figure 4:
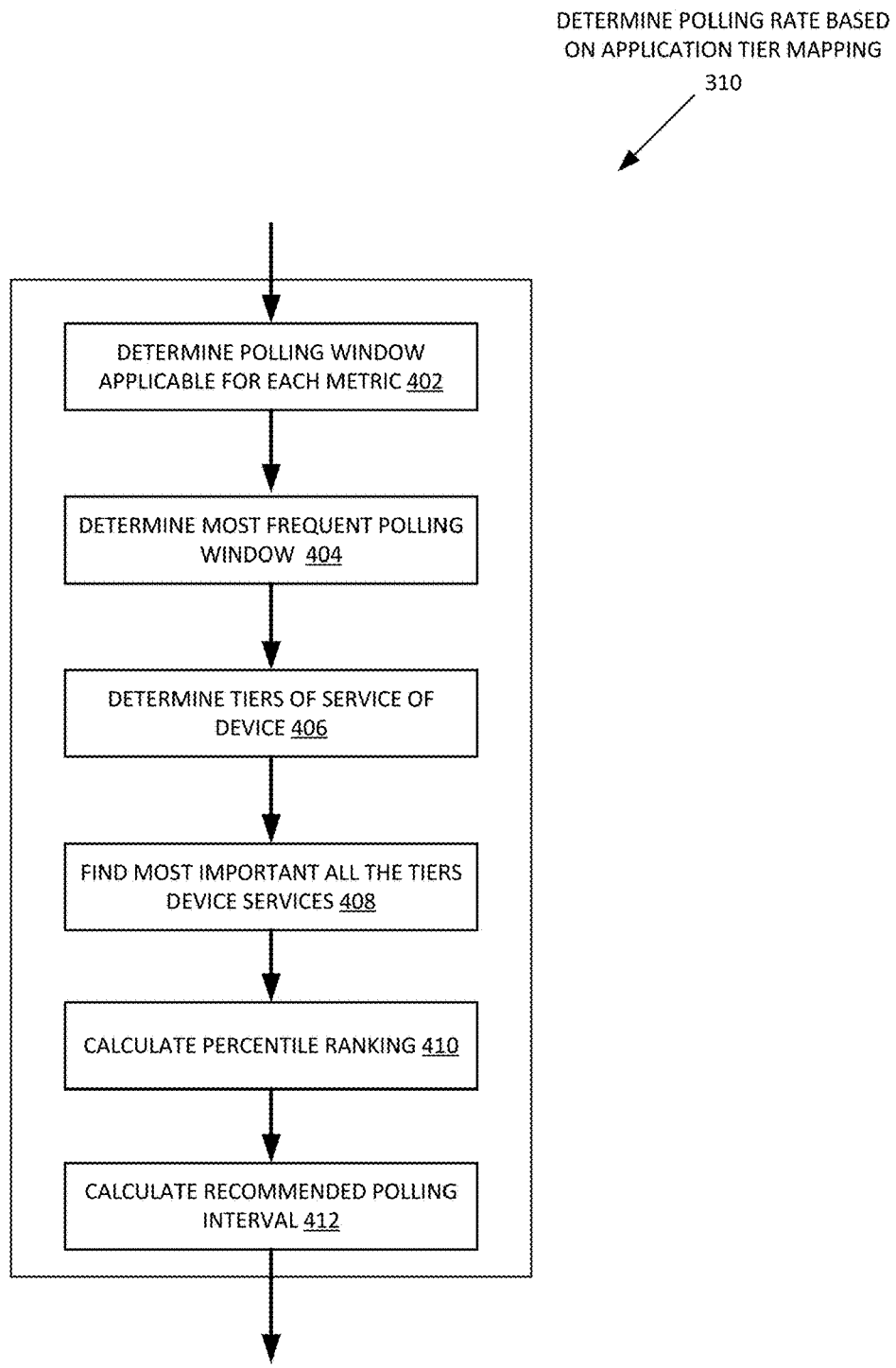
FIG. 4 depicts details of one step of the application-centric infrastructure management process according to some embodiments.

Steps 402 through 412 of FIG. 4 details the process of determining the polling interval of an entity of the enterprise network 105 such as a host which accommodates two or more tiers of service. In step 402, the application-centric control module 206 determine polling window applicable for each metric. For example, if a host executes a tier 0 virtual machine and a tier 5 virtual machine, the tier 0 host read-response alarm threshold is 30 ms with a polling window of 1 hour. The tier 5 host read-response alarm threshold is 80 ms with a polling window of 5 hours, with a total of ten tiers of service in the enterprise network 105.

In step 404, the application-centric control module 206 determines the most frequent polling interval of any number of polling intervals found with each of any number of tiers of service being executed on the same entity of the enterprise network 105. In the above example, the most frequent polling window, or shortest polling window is 1 hour.

In step 406, the application-centric control module 206 determines all the tiers of service that the entity of the enterprise network 105 services. In the above example, in this step, the application-centric control module 206 determines that the host executes the tier 0 device, with a ranking of '1' and the tier 5 device with a ranking of '6'. In some embodiments, the ranking of a device may be determined by adding 1 to the tier of service of the device, so a tier 2 virtual machine would have a ranking of 3 and so on.

In step 408, the application-centric control module 206 determines the highest tier of service that the device serves. In the above example, in this step, the application-centric control module 206 determines that the most important tier of service that the host executes is tier 0.

In step 410, the application-centric control module 206 calculates percentile ranking of the highest tier of service against all of the tiers of service available in the enterprise network 105. The percentile ranking representing an aggregate ranking of the entity of the enterprise network 105. In the above example, in this step, the application-centric control module 206 determines that the highest tier of service that the host executes has a ranking of 1, in the example enterprise network there are ten tiers of service, and this most important tier of service is in a $100^{th}$ percentile.

In another example, the most important tier of service executed on a particular host is tier 4, and had a tier ranking of 5. And assuming there are ten tiers of service in total, then the tier ranking of 5 is 60% percentile, this rank of 5 is important than 60% of all other tiers.

In step 412, the application-centric control module 206 may calculate a recommended polling interval. In the above example, in the previous step, the application-centric control module 206 determined that the most important tier of service that the host executes is more important than 100% of all other tiers of service of the enterprise network. Using the table below, the polling window is divided by 10. The shortest polling window, as previously mentioned is 1 hour, and that is divided by 10. The calculated recommended polling interval is 6 minutes.

| If better than this percentile | Divide Window By this Value |
| --- | --- |
| 90% | 10 |
| 80% | 5 |
| 50% | 2 |
| 0% | 1 |

In step 312, the infrastructure module is configured to determine the infrastructure of the enterprise network 105. The infrastructure module 214 may aid users of IPM appliance 160 with a visual representation of the infrastructure in the context of applications of the enterprise. The reporting module 216 may output infrastructure of the enterprise network 105 in the form of an application topology, showing a representation of the entities associated with a particular application and how the entities are coupled to each other.

In step 314, the application-centric control module 206 may monitor an application to infrastructure mapping of the enterprise network 105. For example, the IT management software or application performance integration platform may provide an application to virtual machine mapping of the enterprise network. While the probes may provide a virtual machine to host mapping.

The application to host mapping requires intermittent monitoring because the resource required by applications may change over time. For example, referring to email application 502 of FIG. 5, the email application 502 is a tier 0 application. The email application 502 includes email application instance 510. The email application instance 510 includes a host 512 executing a virtual machine 514. The application-centric control module 206 may analyze the virtual machine data received from the probe datastore 224 and determine that the virtual machine 514 is being executed on the host 512. The application-centric control module 206 may send a request to the entities datastore 222 to update the entity entry associated with the virtual machine 514 to map to the host 512. Furthermore, the application-centric control module 206 may send a request to the entities datastore 222 to update the entity entry associated with the host 512 to map to the virtual machine 514.

Figure 6:
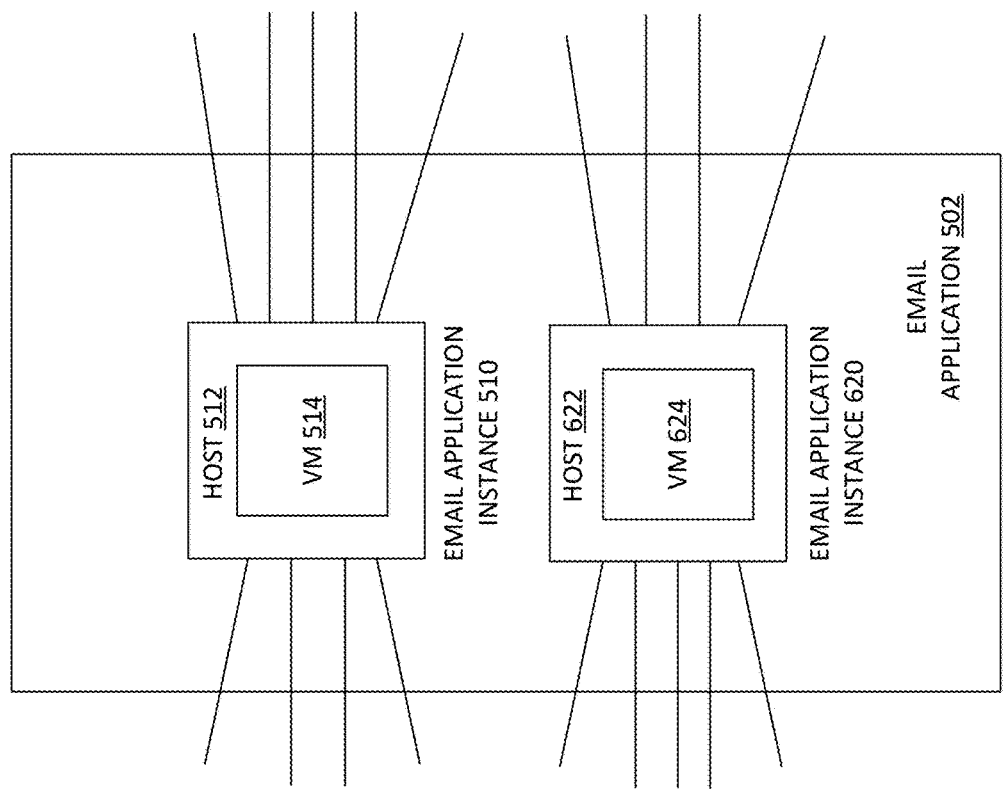
FIG. 6 depicts an example infrastructure of the email application of the enterprise network during a second time period according to some embodiments.
Figure 7:
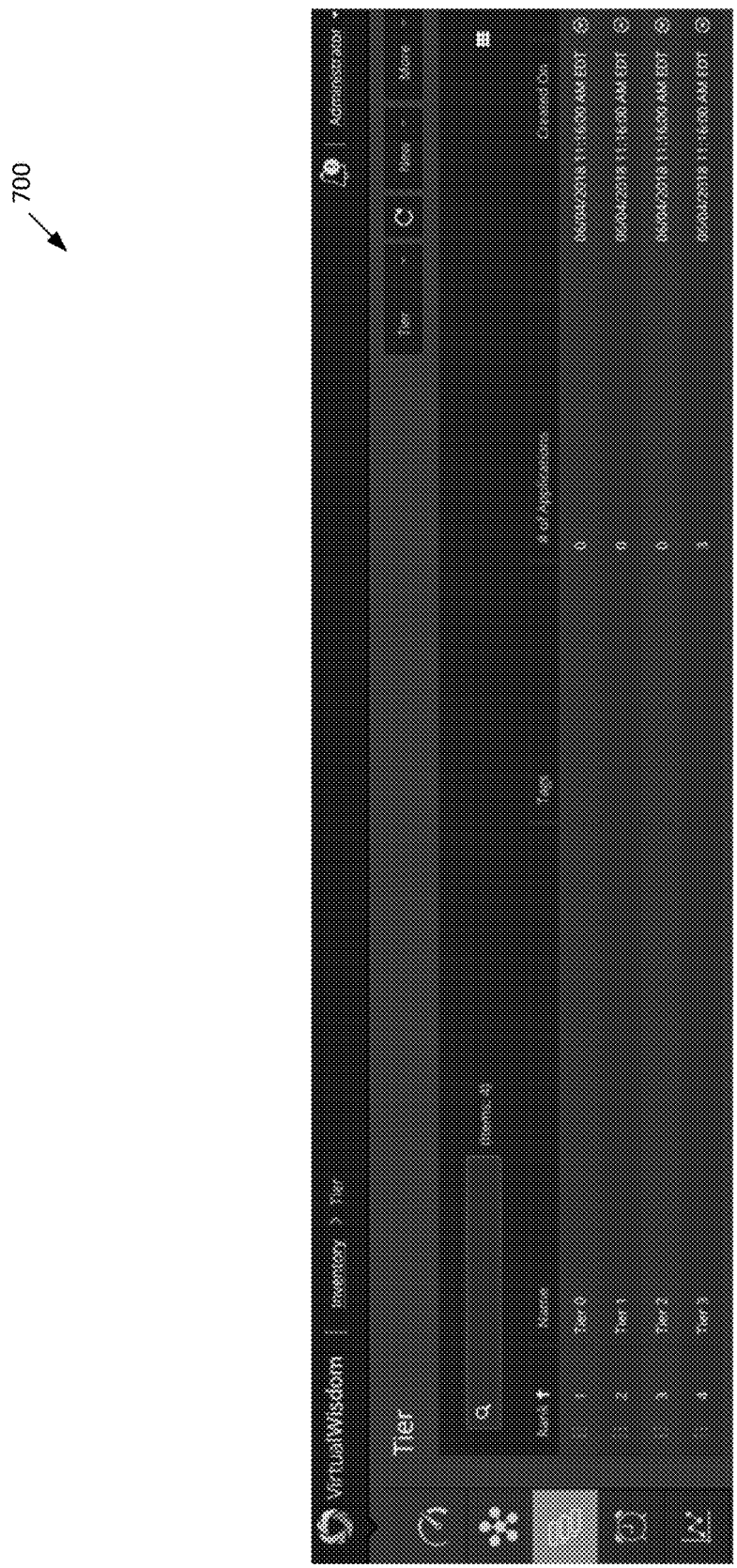
FIG. 7 depicts an example tier of service interface according to some embodiments.

Over the course of a workday, as more people access the email server and increasing the workload on the email application 510, the email application 510 may initiate another instance of the email application, such as email application instance 620 of FIG. 6. The email application instance 620 includes a host 622 and a virtual machine 624. When the host 622 and the virtual machine 624 become part of the email application 502, they are assigned the tier of service of the email application, and thereby at least the polling interval and tier metrics threshold associated with the tier of service of the email application. For example, the host 622 would be subject to the tier 0 host read-response alarm.

In step 316, the application-centric control module 206 may determine that the alarm trigger condition is satisfied based on comparisons between metrics from any of the entities of the enterprise network 105 and their associated tier metric threshold. In response to satisfying the alarm trigger condition, the application-centric control module 206 may trigger an alarm event to the alarm datastore 218.

The alarm datastore 218 may receive the alarm event and create or update an alarm entry. The alarm entry includes attributes of the alarm such as name of the property being measured by the alarm, polling window, polling interval, and alarm count. The alarm datastore 218 may send a request to the reporting module 216 to output the alarm entry to the IT administrator or other user of the enterprise network 105. The reporting module 216 may organize multiple open cases by entity or by tier. Each open case may represent multiple instances of the same SLA alarm.

Figure 10:
FIG. 10 depicts another example alarm event output according to some embodiments.

FIG. 10 depicts an example output interface 1000. The reporting module 216 may output to the IT administrator open cases organized by entity or by tier. Area 1010 of the output interface 1000 may output open cases organized by entity type, while area 1020 may output open cases organized by tier.

In step 318, the input module 204 may receive from the IT administrator or other user of the enterprise network 105 a change ticket to the IT management software platform, or the application performance integration platform in response to the output of alarm notification. The change ticket may represent one or more changes to one or more entities of the enterprise network 105. In some embodiments, the change ticket represents changes to one or more connections between various entities of the enterprise network 105. The IT administrator may provide the change ticket to resolve one or more alarm notifications.

Figure 12:
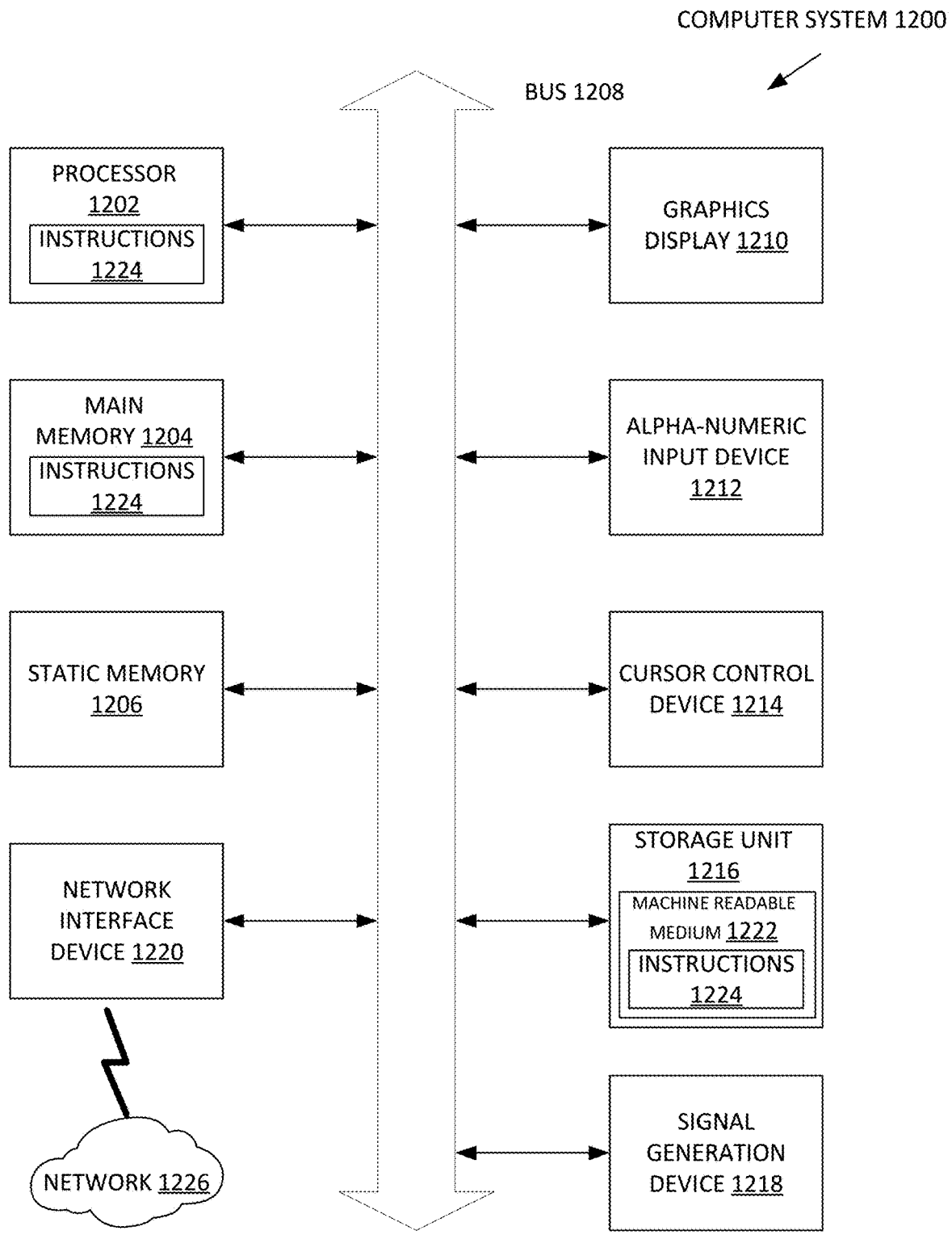
FIG. 12 depicts a block diagram illustrating entities of an example machine according to some embodiments.
Figure 13:
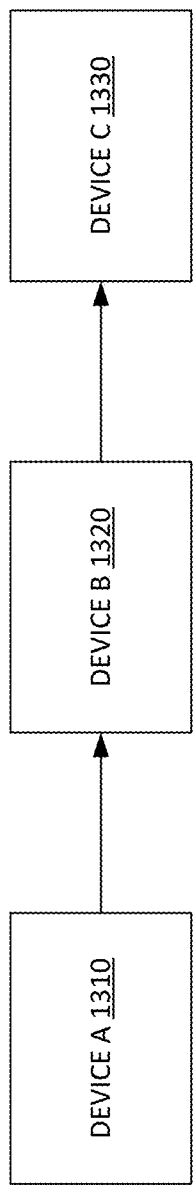
FIG. 13 depicts an example of a simplified topology of an enterprise network.

FIG. 12 is a block diagram illustrating, entities of an example machine able to read instructions from a machine-readable medium and execute those instructions in a processor to perform the machine processing tasks discussed herein, such as the engine operations discussed above. Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web application, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a data store 1216, a signal generation device 1218 (e.g., a speaker), an audio input device 1226 (e.g., a microphone) and a network interface device 1220, which also are configured to communicate via the bus 1208.

The data store 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network (not shown) via network interface 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but should not be limited to, data repositories in the form of solid-state memories, optical media, and magnetic media.

Figure 14:
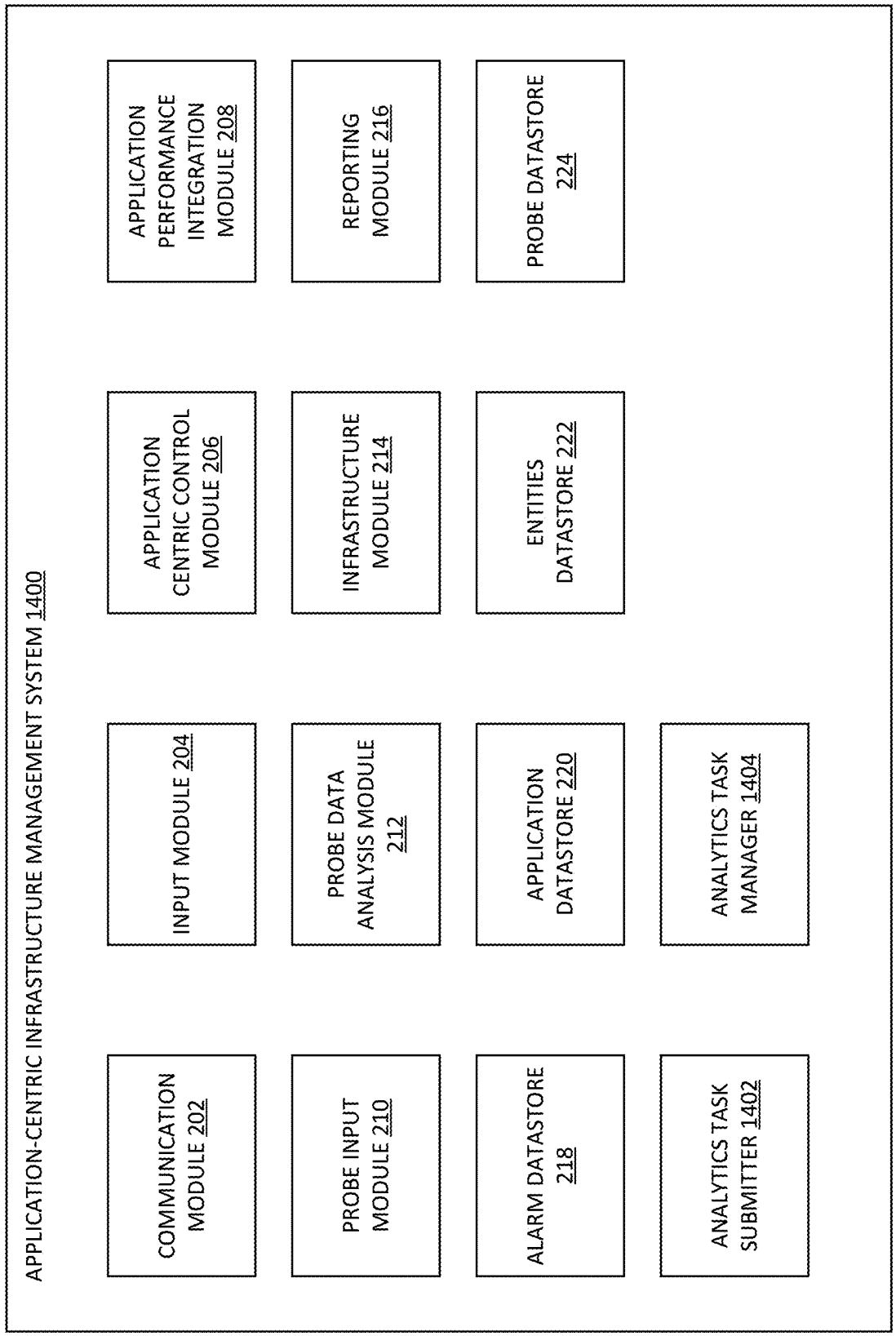
FIG. 14 depicts a block diagram of another example of an application-centric infrastructure management system according to some embodiments.

FIG. 14 depicts a block diagram of another example of an application-centric infrastructure management system 1400 according to some embodiments. This example of the application-centric infrastructure management system 1400 may include all or some modules that are similar to that of the application-centric infrastructure management system 190 of FIG. 2. The application-centric infrastructure management system 1400 includes an analytics task submitter 1402 and an analytics task manager 1404.

As discussed herein, the application-centric infrastructure management system 1400 may perform various actions, including analyzing data flows in a network to detect problems and identify root causes. As the network grows, the amount of data to analyze significantly increases. In order to ensure effective resource management, improve speed, and enable scalability, the application-centric infrastructure management system 1400 may orchestrate and/or pipeline analytics tasks.

In one example, the analytic task submitter 1402 may receive an analytic task (i.e., a data flow to be analyzed for problems and/or identify causes of problems) of the enterprise system 100. Analytic tasks may be automatically generated by the application-centric infrastructure management system 1400. The analytics task submitter 1402 may determine a position of the analytic task in a task queue. The determination of the analytic task position may be based (at least partially) a priority indicator of the analytic task.

In some embodiments, a priority indicator of an analytic task is or is based on a service level assurance (SLA) value or tier of service. For example, an analytic task may be to detect problems associated with the function or data flows of an application or device. The priority indicator of the analytic task may inherit the SLA or tier of service of the application or device. As such, the priority indicator of the analytic task may be the same as the importance of the data flow or performance of the objects/software that the analytic task is to assess. In some embodiments, the priority indicator of an analytic task may be set by a user (e.g., broadly by a user that designates a group or set or tasks or individually).

Further, in some embodiments, the priority indicator may be based on analytic task factors such as the time the analytic task was received by the analytics task submitter. For example, one or more analytic task factors may be inputted by the user of the application-centric infrastructure management system 1400. As the analytics task submitter 1402 receives new analytic tasks, the analytics task submitter 1402 may dynamically determine the task queue position for the analytic tasks based at least on the priority indicator. As a result, the analytic task may be positioned in the task queue based, at least in part, on its priority indicator.

The analytics task submitter 1402 may receive a priority indicator for one or more analytic tasks and/or may determine the priority indicator for the one or more analytic tasks (e.g., through assessment of inheritance or manually from a user as discussed herein).

The analytics task manager 1404 may seek to execute the analytic tasks of the task queue starting from a position in the task queue (e.g., the head of the queue).

In some embodiments, the analytics task manager 1404 retrieves an analytic task from the task queue and sends the analytic task to the analytic service. The analytic service may estimate the analytic service resources required to execute the analytic task. The analytics service may also assess available analytic service resources in view of other analytics tasks that are being processed by the analytics service at that time.

If there are sufficient analytics service resources available to perform the analytic task, the analytics service may perform the analytic task. In some embodiments, the analytic service may optionally send an acceptance signal if the analytic service determines that there is sufficient analytic resource to execute the analytic task.

If there are not currently available sufficient analytics service resources to perform the analytic task, the analytic service may send a rejection signal to the analytics task manager 1404.

If the analytics task manager 1404 receives the rejection signal from the analytic service, the analytics task manager 1404 may move the analytic task to a new position in the task queue (e.g., end of the task queue). In one example, the analytics task manager 1404 may move the analytic task to a position lower down the task queue. In various embodiments, the analytics task manager 1404 may lower the priority indicator of the analytic task (e.g., by one or by one level of less significant priority), which may push the analytic task further down the task queue (e.g., such that the analytic task may be executed by the analytic service at a later time). In some embodiments, the analytics task manager 1404 may determine the lower position based on an estimated time frame of when the analytic service may have sufficient analytic resource to execute the analytic task.

In various embodiments, along with the rejection signal, the analytic service may send an estimated time frame of when the analytic service may have sufficient analytic resources to execute the analytic task. In some embodiments, if the analytic service determines that the current workload is greater than a predetermined threshold, the analytic service may send the rejection signal, along with a utilization indication signal to the analytics task manager 1404. The analytics task manger 1404, based on receiving the utilization indication may delay sending new analytic tasks from the task queue or the analytic task at the head of the task queue to the analytic service for a predetermined period of time (e.g., either a default period of time or a period of time that is determined based on the utilization indication).

If the analytics task manager 1404 receives the optional acceptance signal from the analytic service, the analytic task manager 1404 may move to send the next analytic task in the task queue to the analytics service.

In some embodiments, the analytics task manager 1404 may periodically receive from the analytic software, the current workload of the analytic software, and an optional utilization indication signal. The optional utilization indication signal may be sent by the analytic software if the current workload of the analytic software is greater than a predetermined threshold.

Based on the current workload of the analytic software and/or the optional utilization indication, the analytics task manager 1404 may determine whether or not to send the analytic task from the task queue to the analytic software, or to hold off on sending the analytic task to the analytic software for a predetermined period of time.

In some embodiments, the analytics service may throttle back (e.g., slow or terminate) other analytic tasks that are being executed by the analytics service. The analytic service may utilize an estimate of the analytics service resources to execute a particular analytic task to determine whether to throttle back one or more analytic tasks with a lower priority indicator already being executed by the analytic service to free up analytic resources. In some embodiments, the amount of throttling done by the analytics service may be different depending on the priority indicator of the currently executed on the analytic service and the priority indicator of the newly submitted analytic task.

The analytics service may send the rejection signal to the analytics task manager 1404 if it determines that it is not able to throttle back one or more analytic tasks currently being executed if the analytic tasks currently being executed has a higher priority indicator (or has the same priority indicator) than the priority indicator of the particular analytic task.

In some embodiments, the analytics task manager 1404 may send a request to an analytics service to throttle back one or more analytic tasks with a lower priority indicator already being executed by the analytic service when the task at the head of the task queue has a higher priority indicator. For example, the analytic service is currently executing four analytic tasks, with priority indicators of 0, 2, 2, and 4, respectively. In this example, the analytic service may periodically send analytic task information regarding the number of analytic tasks, the priority indicator of each task, and an estimated completion time of one or more analytic tasks currently being executed. If the analytics task manager 1404 receives a new analytic task from the analytics task submitter 1402 with a priority indicator of 1, the analytics task manager 1404 may send the new analytic task to the analytics service with a request to throttle the three analytic tasks with a priority indicator of 2, 2, and 4, respectively.

In some embodiments, the analytics task manager 1404 may provide an amount of throttle for each of the analytic tasks to the analytic service. The analytics task manager 1404 may include a request to throttle some tasks more than other tasks. For example, the analytics task manager 1404 may request that some analytic tasks with a lessor priority indicator be throttled more than other analysis tasks with a priority indicator that is associated as being more important. In various embodiments, the amount of throttling requested by the analytics task manager 1404 may be different depending on the priority indicators of analytic services currently being executed on the analytic service.

Figure 15:
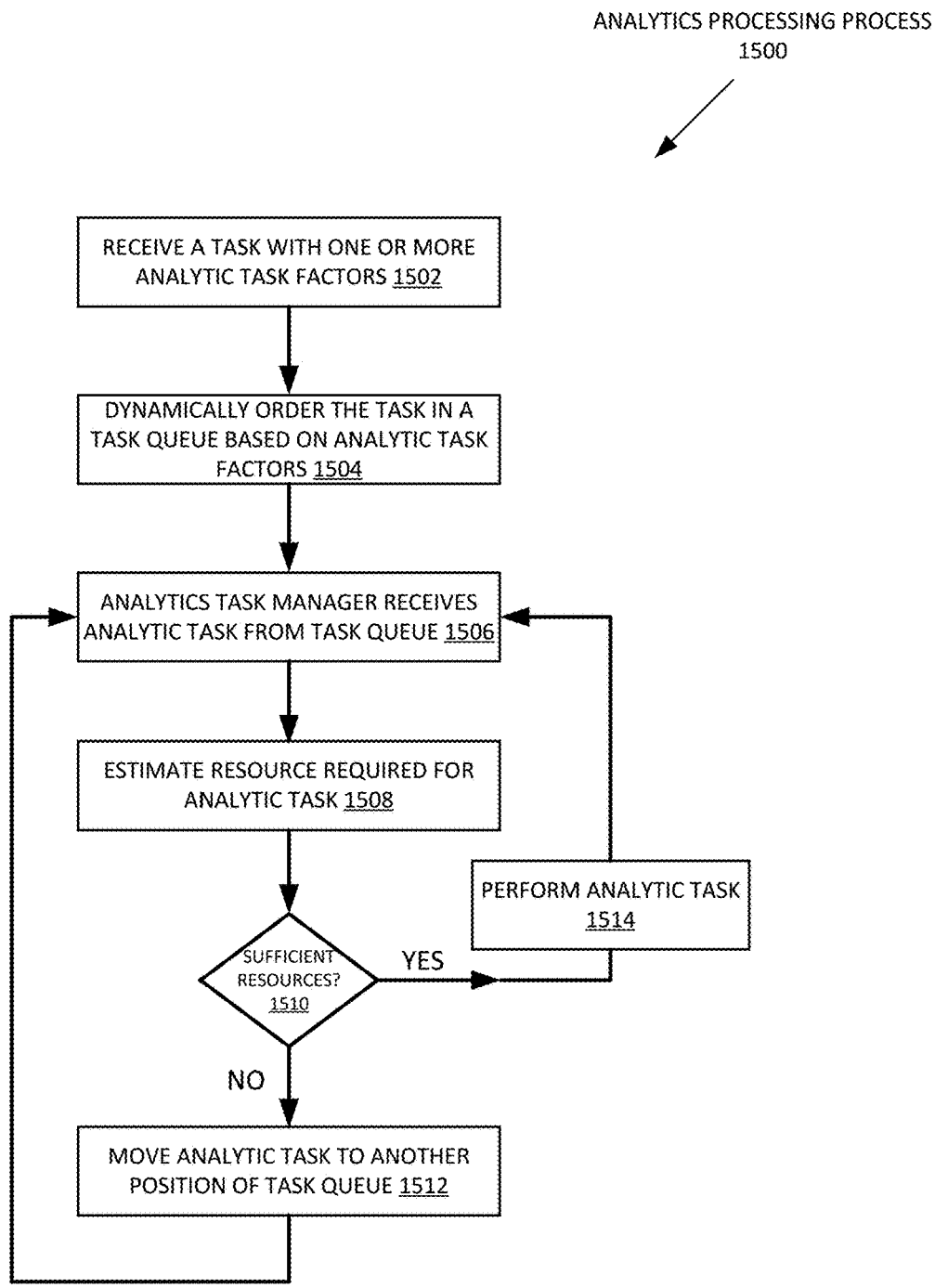
FIG. 15 depicts a flow chart of an analytics processing throttling process according to some embodiments.

FIG. 15 depicts a flow chart of an analytics processing throttling process 1500 according to some embodiments. In step 1502, the analytics task submitter 1402 may receive an analytic task of the application-centric infrastructure management system 1400. In some embodiments, analytics task submitter 1402 may receive a priority indicator and one or more analytic task factors associated with the newly received analytic task. Analytic factors may include a time that the analytic task was received by the analytic task submitter 1402, an analytic application priority, and a tier of service of one or more entities of the enterprise network associated with the analytic task. For example, the analytics task submitter 1402 may receive an analytic task associated with the application discovery analytic application to discover and monitor an application with a tier of service of 0. In some embodiments, the user of the application-centric infrastructure management system 1400 may input the priority indicator of the analytic task. In various embodiments, the user of the application-centric infrastructure management system may input one or more analytic task factors associated with the analytic task.

In step 1504, the analytics task submitter 1402 may dynamically determine the order or position in the task queue for the received analytic task. The determination may be based at least on the priority indicator of the received analytic task. In some embodiments, the determination may be based on one or analytic task factors. The analytic task factor may include a time that the analytic task was received by the analytic task submitter, an analytic application priority, and/or a tier of service of one or more entities of the enterprise network associated with the received analytic task. In some embodiments, the analytics task submitter 1402 may calculate a priority indicator for an analytic task based on all or some of the analytic task factors. As the analytics task submitter 1402 receives subsequent analytic tasks, the analytics task submitter 1402 may determine the order or position for subsequent analytic tasks based on their respective priority indicators and/or analytic task factors.

In step 1506, the analytics task manager 1404 may send the analytic task at the head or beginning of the task queue to the analytic service. The analytic task may include one or more of the analytic task factors, a required task completion date or time, and the like. In some embodiments, instead of the analytic task, the analytics task manager 1404 may send a request to perform the analytic task to the analytic service.

In step 1508, the analytic service may estimate the analytic service resources required to execute the activity task. The analytic service may utilize the estimate to determine if the analytics service has sufficient resource currently available to execute the analytic task. Once the analytic service makes this determination, the analytic service may send a rejection (or optionally, an acceptance) signal to the analytics task manager 1404.

In step 1510, the analytics task manager 1404 and/or the analytics service determines if there are sufficient available resources to perform the activity task.

If there are sufficient available resources, the analytic service may perform the analytic task in step 1514 and optionally send an acceptance signal to the analytics task manager 1404. The analytics task manager 1404 may retrieve the next analytics task from the task queue in step 1506.

If there are not sufficient available resources, the analytics processing process 1500 may proceed to step 1512. If the analytics task manager 1404 receives the rejection signal from the analytic service, the analytics task submitter 1402 may move the analytic task to a position lower down the task queue. In some embodiments, the analytics task submitter 1402 may send the analytic task to the end of the task queue. In various embodiments, the analytics task submitter 1402 may lower the priority indicator of the analytic task, which would push the analytic task further down the task queue, such that the analytic task may be executed by the analytic service at a later time.

In one embodiment of the analytics processing process 1500, the analytics task manager 1404 may be configured to perform the steps of 1506 through 1512. For example, the analytics task manager 1404 may receive from the analytic service, the current workload of the analytic software, and/or a utilization indication signal. The utilization indication signal may be sent by the analytic software if the current workload of the analytic software is greater than a predetermined threshold. If the utilization indication signal indicates that the utilization is above a predetermined limit, the analytics task manager 1404 may reposition the activity task in the task queue.

In some embodiments, the analytics task manager 1404 may estimate the number of analytic service resources required to execute the analytic task. Based on the received information from the analytic software, and the estimate of the amount of analytic service resource required to execute the analytic task, the analytics task manager 1404 determines whether or not to send the analytic task to the analytic software. In some embodiments, the analytics task manager 1404 may hold off on sending the analytic task to the analytic software for a predetermined period of time.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer-readable persistent storage device (e.g., hard disk), loaded into the memory, and executed by one or more processors as described above in connection with FIG. 12. Alternatively, hardware or software modules may be stored elsewhere within a computing system.

As referenced herein, a computer or computing system includes hardware elements used for the operations described here regardless of specific reference in FIG. 12 to such elements, including, for example, one or more processors, high-speed memory, hard disk storage, and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors; and
memory containing instructions configured to control the one or more processors to:
receive, from an analytic service, assessed available resources of an analytic software of the analytic service;
receive, by an analytics task submitter of an application-centric infrastructure management system, a first data flow analysis task of a plurality of data flow analysis tasks, the first data flow analysis task including a priority indicator associated with the first data flow analysis task, the application-centric infrastructure management system including a digital device that manages the plurality of data flow analysis tasks, the first data flow analysis task being responsible for monitoring an application of an enterprise network;
determine, by the analytic task submitter, a position of the first data flow analysis task in a task queue, the task queue including the plurality of data flow analysis tasks arranged in an order according to their respective priority indicators, the determining the position of the first data flow analysis task being based at least on the priority indicator of the first data flow analysis task;
select, by an analytic task manager of the application-centric infrastructure management system, the first data flow analysis task from the task queue based on the order of the task queue;
estimate, by the analytic task manager, a number of analytic service resources required to execute the first data flow analysis task;
determine, by the analytic task manager-if the analytics service has sufficient available analytical resources to perform the first data flow analysis task based on the estimated number of analytic resources required to execute the first data flow analysis task and the assessed available resources of the analytic software;
in response to determining that there is insufficient analytic resources to perform the first data flow analysis task:
reposition the first data flow analysis task within the task queue to a position lower down the task queue, wherein the repositioning the first data flow analysis task within the task queue includes lowering the priority indicator of the first data flow analysis task by one level of less significant priority, and wherein the position lower down in the task queue is determined based on an estimated time frame of when the analytic service may have sufficient analytic resource to execute the analytic task; and
after repositioning the first data flow analysis task, retrieve a second data flow analysis task of the plurality of data flow analysis tasks having lower priority than an original priority of the first data flow analysis task from the task queue, thereby reducing instances of over burdening the analytic service.

2. The system of claim 1 wherein when there is insufficient analytic resources to perform the first data flow analysis task, the analytic task manager receives a rejection signal.

3. The system of claim 1 comprising memory further containing instructions configured to control the one or more processor to: send, by the analytics service, a utilization indication signal if a current workload of the analytic service is greater than a predetermined threshold.

4. The system of claim 1, comprising memory further containing instructions configured to control the one or more processor to:
perform, by the analytic service, the second data flow analysis task; and
receive, by the analytic task manager, a second indication that the analytics service does have sufficient available analytical resources to perform the second data flow analysis task.

5. The system of claim 4 wherein the second indication is an acceptance signal.

6. The system of claim 1, wherein determining the position of the first data flow analysis task is further based on a time that the first data flow analysis task is received by the analytic task submitter.

7. The system of claim 1, wherein determining the position of the first data flow analysis task is further based on a tier of service of one or more entities of the enterprise network associated with the first data flow analysis task.

8. A method comprising:
receiving, from an analytic service, assessed available resources of an analytic software of the analytic service;
receiving, by an analytics task submitter of an application-centric infrastructure management system, a first data flow analysis task of a plurality of data flow analysis tasks, the first data flow analysis task including a priority indicator associated with the first data flow analysis task, the application-centric infrastructure management system including a digital device that manages the plurality of data flow analysis tasks, the first data flow analysis task being responsible for monitoring an application of an enterprise network;
determining, by the analytic task submitter, a position of the first data flow analysis task in a task queue, the task queue including a plurality of data flow analysis tasks arranged in an order according to their respective priority indicators, the determining the position of the first data flow analysis task being based at least on the priority indicator of the first data flow analysis task;
selecting, by an analytic task manager of the application-centric infrastructure management system, the first data flow analysis task from the task queue based on the order of the task queue;
estimating, by the analytic task manager, a number of analytic service resources required to execute the first data flow analysis task;
determining, by the analytic task manager, if the analytics service has sufficient available analytic resources to perform the first data flow analysis task based on the estimated number of analytic resources required to execute the first data flow analysis task and the assessed available resources of the analytic software;

in response to determining that there is insufficient analytic resources to perform the first data flow analysis task:

repositioning the first data flow analysis task within the task queue to a position lower down the task queue, wherein the repositioning the first data flow analysis task within the task queue includes lowering the priority indicator of the first data flow analysis task by one level of less significant priority, and wherein the position lower down in the task queue is determined based on an estimated time frame of when the analytic service may have sufficient analytic resource to execute the analytic task; and after repositioning the first data flow analysis task, retrieving a second data flow analysis task of the plurality of data flow analysis tasks having lower priority than an original priority of the first data flow analysis task from the task queue, thereby reducing instances of over burdening the analytic service.

9. The method of claim 8 wherein when there is insufficient analytic resources to perform the first data flow analysis task, the analytic task manager receives a is rejection signal.

10. The method of claim 8 further comprising: sending, by the analytics service, a utilization indication signal if the current workload of the analytic service is greater than a predetermined threshold.

11. The method of claim 8 further comprising:
performing, by the analytic service, the second data flow analysis task; and
receiving, by the analytic task manager, a second indication that the analytics service does have sufficient available analytical resources to perform the second data flow analysis task.

12. The method of claim 11 wherein the second indication is an acceptance signal.

13. The method of claim 8, wherein determining the position of the first data flow analysis task is further based on a time that the first data flow analysis task is received by the analytic task submitter.

14. The method of claim 8, wherein determining the position of the first data flow analysis task is further based on a tier of service of one or more entities of the enterprise network associated with the first data flow analysis task.

15. A non-transitory computer readable medium including executable instructions, the instructions being executable by a processor to perform a method, the method comprising:

receiving, from an analytic service, assessed available resources of an analytic software of the analytic service;

receiving, by an analytics task submitter of an application-centric infrastructure management system, a first data flow analysis task of a plurality of data flow analysis tasks, the first data flow analysis task including a priority indicator associated with the first data flow analysis task;

determining, by the analytic task submitter, a position of the first data flow analysis task in a task queue, the task queue including a plurality of analytic tasks arranged in an order according to their respective priority indicators, the determining the position of the first data flow analysis task being based at least on the priority indicator of the first data flow analysis task, the application-centric infrastructure management system including a digital device that manages the plurality of data flow analysis tasks, the first data flow analysis task being responsible for monitoring an application of an enterprise network;

selecting, by an analytic task manager of an application-centric infrastructure management system, the first data flow analysis task from the task queue based on the order of the task queue;

estimating, by the analytic task manager, a number of analytic service resources required to execute the first data flow analysis task;

determining, by the analytic task manager, if the analytics service has sufficient available analytical resources to perform the first data flow analysis task based on the estimate number of analytic resources required to execute the first data flow analysis task and the assessed available resources of the analytic software;

in response to determining that there is insufficient analytic resources to perform the first data flow analysis task:

repositioning the first data flow analysis task within the task queue to a position lower down the task queue, wherein the repositioning the first data flow analysis task within the task queue includes lowering the priority indicator of the first data flow analysis task by one level of less significant priority, and wherein the position lower down in the task queue is determined based on an estimated time frame of when the analytic service may have sufficient analytic resource to execute the analytic task; and after repositioning the first data flow analysis task, retrieving a second data flow analysis task of the plurality of data flow analysis tasks having lower priority than an original priority of the first data flow analysis task from the task queue, thereby reducing instances of over burdening the analytic service.

16. The non-transitory computer readable medium of claim 15 including executable instructions, the instructions being executable by a process to perform the method, the method further comprising:

performing, by the analytic service, the second data flow analysis task; and receiving, by the analytic task manager, a second indication that the analytics service does have sufficient available resources to perform the second data flow analysis task.

* * * * *